United States Patent
Izumi et al.

(10) Patent No.: US 12,541,305 B2
(45) Date of Patent: Feb. 3, 2026

(54) CACHE SERVER

(71) Applicant: Kioxia Corporation, Tokyo (JP)

(72) Inventors: Tatsuki Izumi, Yokohama (JP); Kohei Okuda, Koganei (JP); Shinichi Kanno, Ota (JP)

(73) Assignee: Kioxia Corporation, Tokyo (JP)

( * ) Notice: Subject to any disclaimer, the term of this patent is extended or adjusted under 35 U.S.C. 154(b) by 0 days.

(21) Appl. No.: 18/830,294

(22) Filed: Sep. 10, 2024

(65) Prior Publication Data
US 2025/0265017 A1 Aug. 21, 2025

(30) Foreign Application Priority Data
Feb. 20, 2024 (JP) .................. 2024-023677

(51) Int. Cl.
*G06F 12/00* (2006.01)
*G06F 3/06* (2006.01)

(52) U.S. Cl.
CPC .......... *G06F 3/0619* (2013.01); *G06F 3/0659* (2013.01); *G06F 3/067* (2013.01)

(58) Field of Classification Search
None
See application file for complete search history.

(56) References Cited

U.S. PATENT DOCUMENTS

| 9,558,065 B2 | 1/2017 | Yoshida et al. |
| 2020/0389538 A1* | 12/2020 | Deng .................. H04L 63/083 |
| 2022/0398201 A1* | 12/2022 | Goto .................. G06F 3/061 |

OTHER PUBLICATIONS

U.S. Appl. No. 18/829,375, filed Sep. 10, 2024, 14 pages.

* cited by examiner

Primary Examiner — Daniel D Tsui
(74) Attorney, Agent, or Firm — Oblon, McClelland, Maier & Neustadt, L.L.P.

(57) ABSTRACT

According to one embodiment, in a case where an error has occurred in reading a first content, a processor of a cache server calculates a delivery capability of the cache server. In a case where it is determined that the calculated delivery capability exceeds a first reference value, the processor does not execute recovering the first content. In a case where it is determined that the calculated delivery capability does not exceed the first reference value, the processor executes recovering the first content, delivering the recovered first content to a client via a network, and writing the recovered first content to a nonvolatile memory.

19 Claims, 19 Drawing Sheets

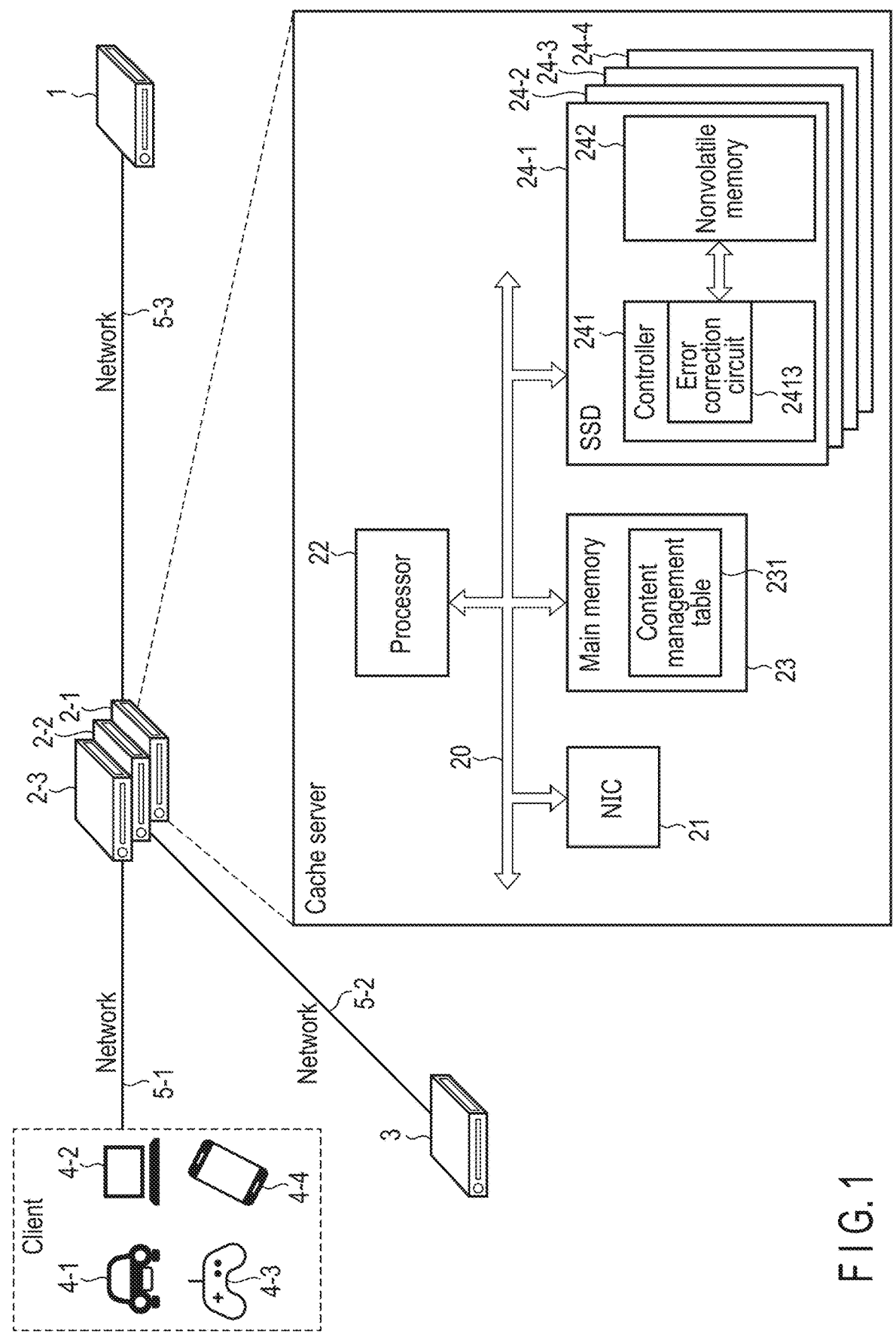
F I G. 1

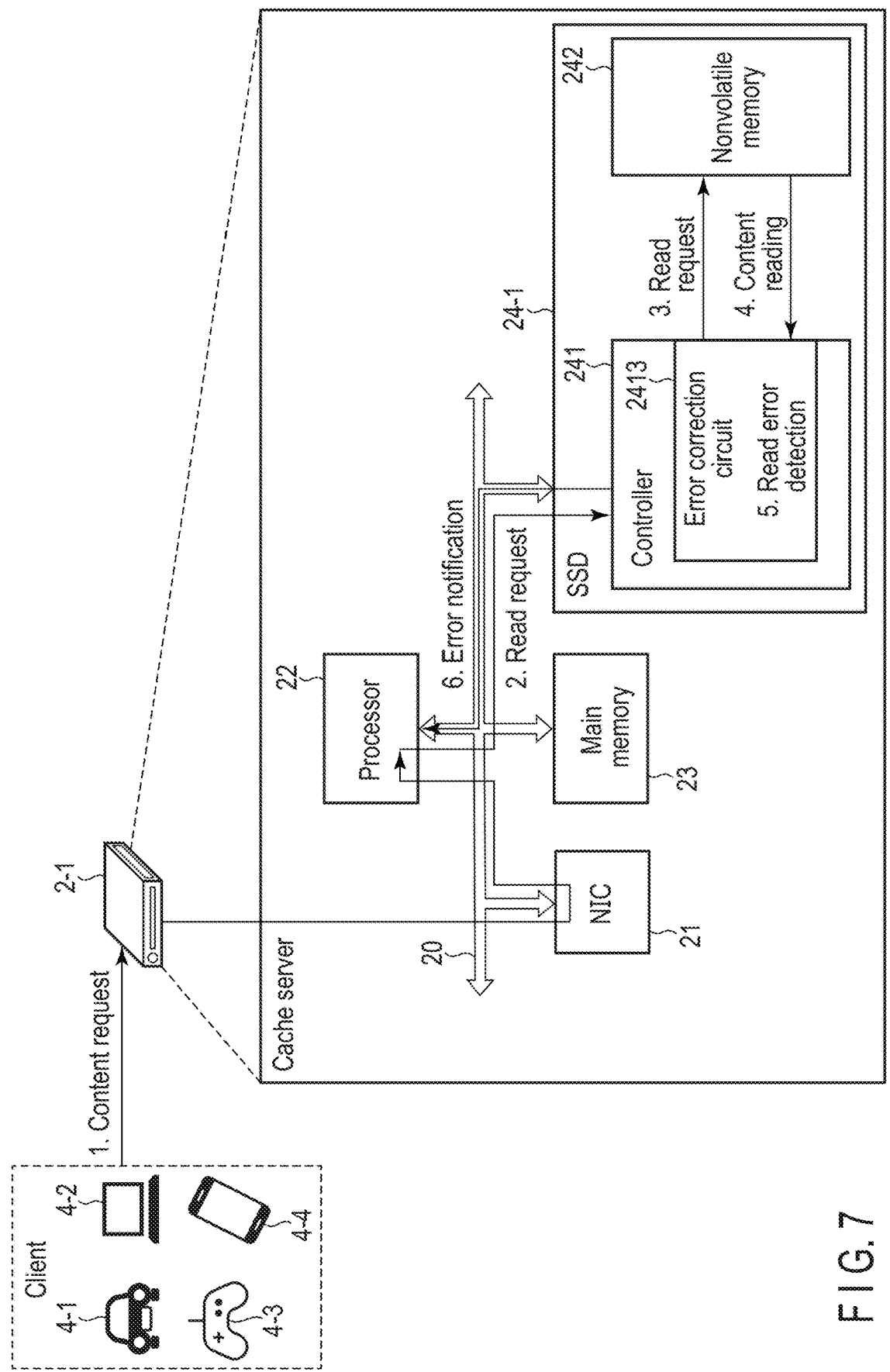
F I G. 7

| Content | Predicted number of reads per second | ... |
|---|---|---|
| Content C1 | 30 | ... |
| Content C2 | 50 | ... |
| Content C3 | 20 | ... |
| Content C4 | 30 | ... |
| Content C5 | 45 | ... |
| Content C6 | 25 | ... |
| Delivery capability | A1 | |

F I G. 11

| Content | Predicted number of reads per second | ... |
|---|---|---|
| Content C1 | 30 | ... |
| Content C2 | 50 | ... |
| Content C3 | 20 | ... |
| Content C4 (Read error) | 30 | ... |
| Content C5 | 45 | ... |
| Content C6 | 25 | ... |
| Delivery capability | A1→A2 (A1>A2) | |

F I G. 12

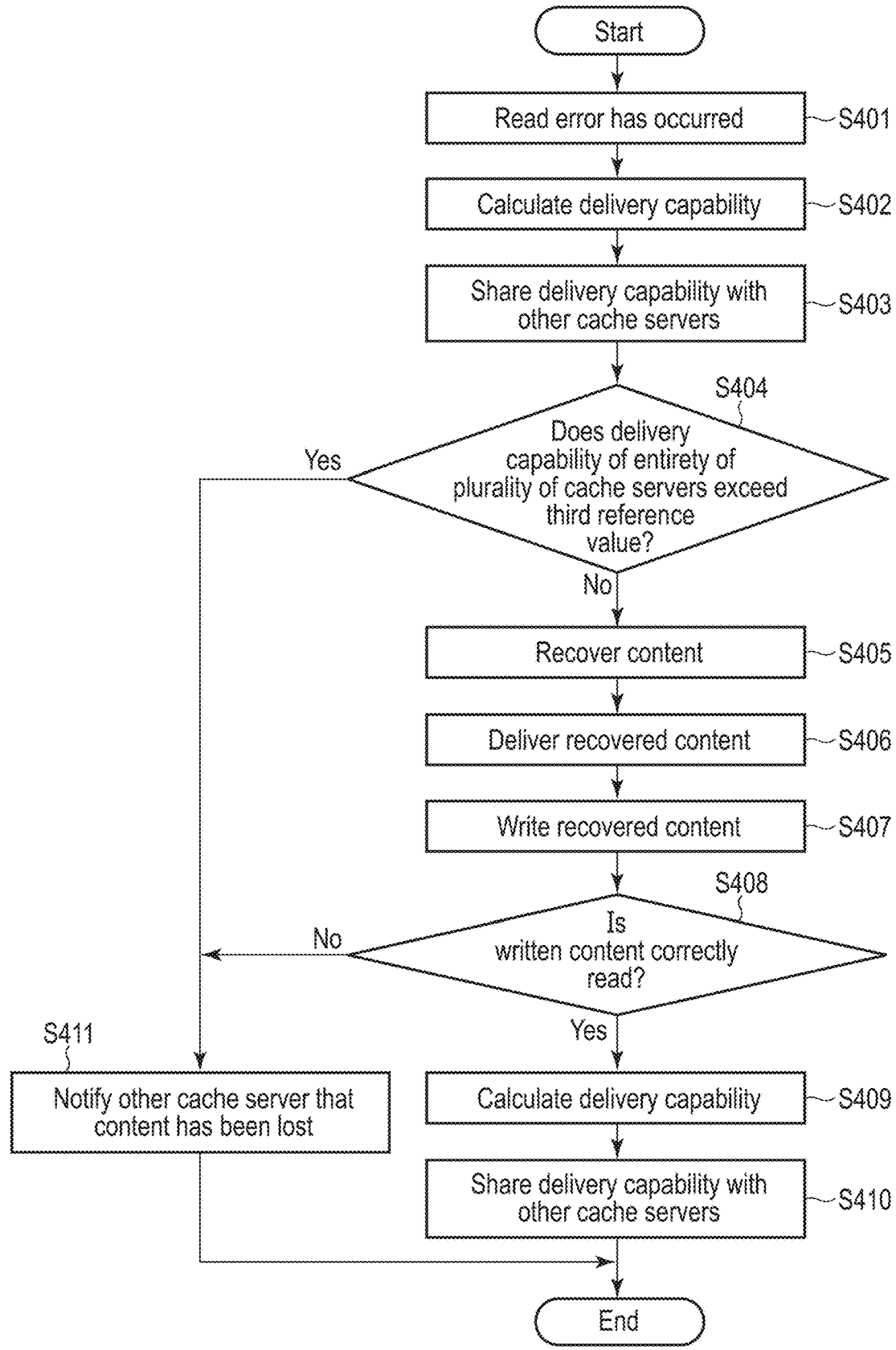
F I G. 15

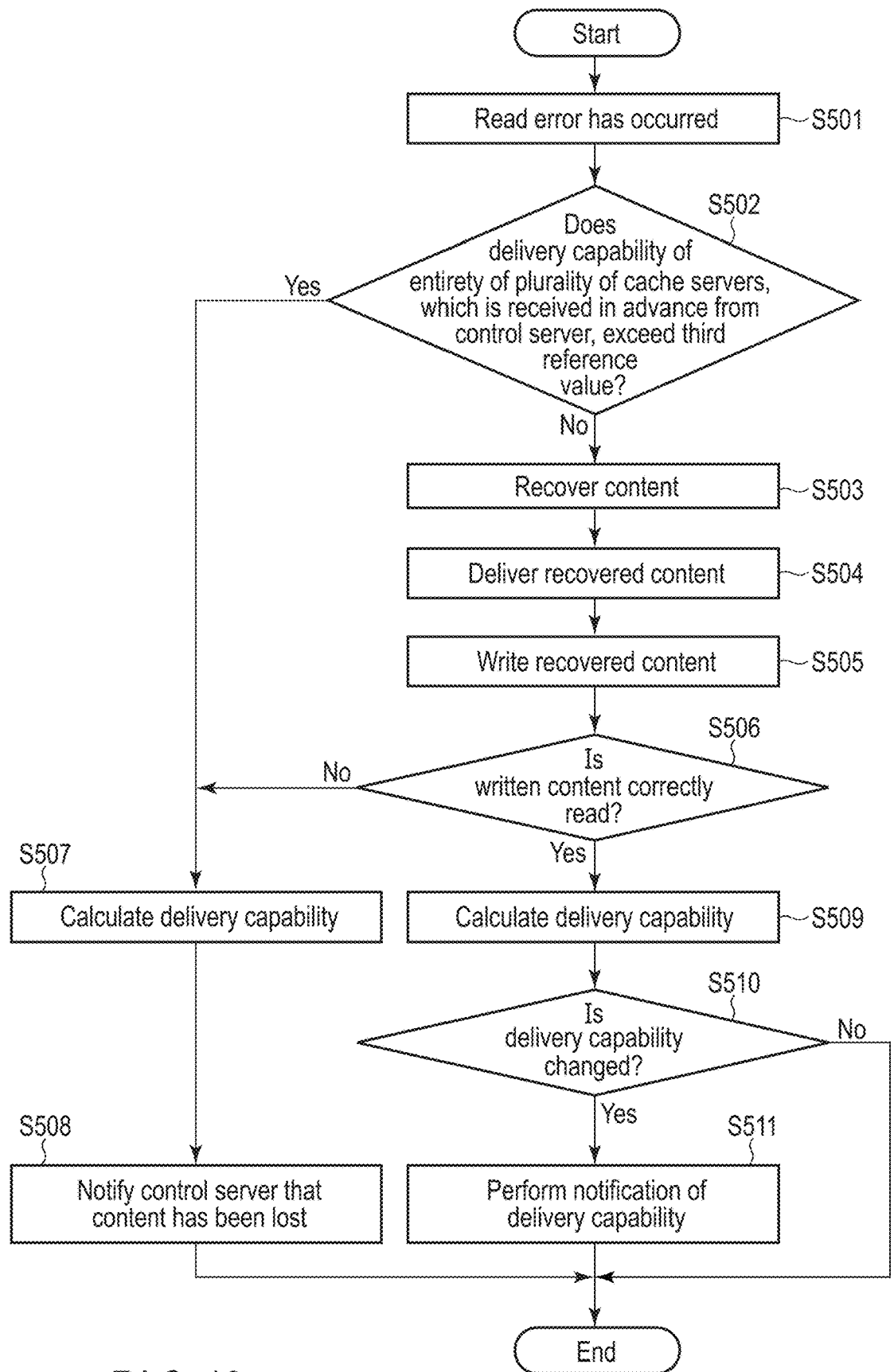
F I G. 16

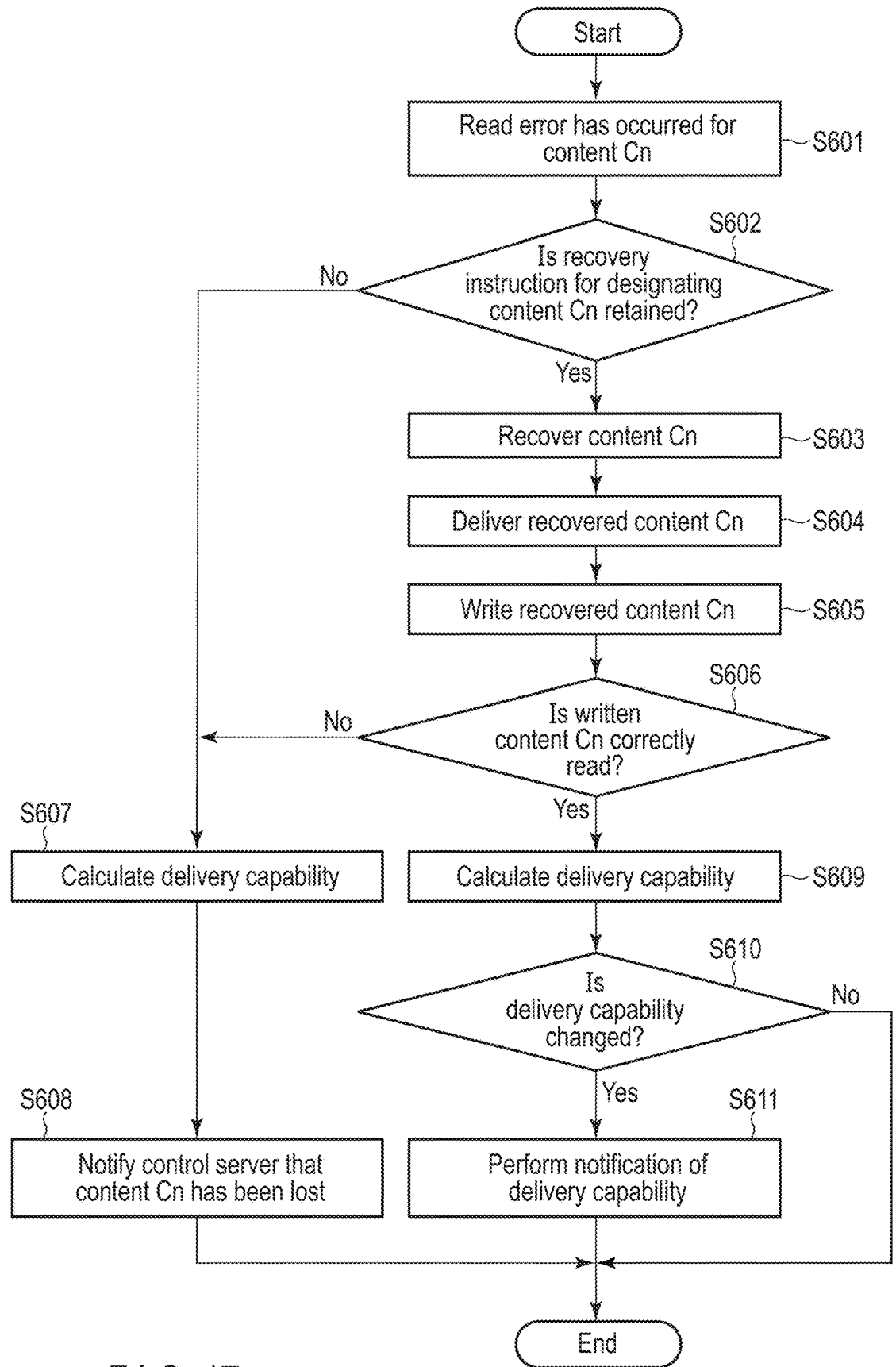
F I G. 17

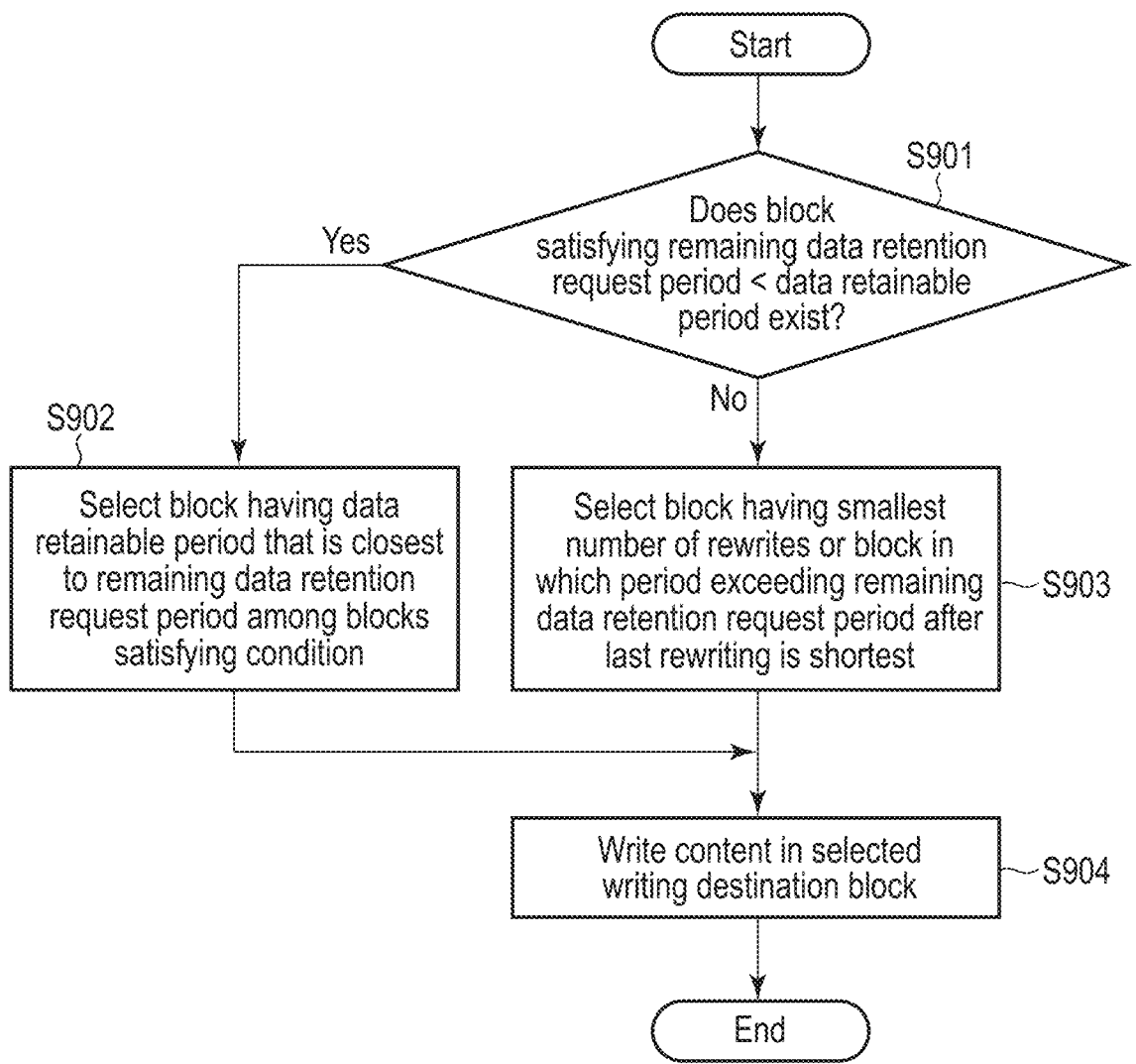
F I G. 21

CACHE SERVER

CROSS-REFERENCE TO RELATED APPLICATIONS

This application is based upon and claims the benefit of priority from Japanese Patent Application No. 2024-023677, filed Feb. 20, 2024, the entire contents of which are incorporated herein by reference.

FIELD

Embodiments described herein relate generally to a cache server for performing a content delivery service.

BACKGROUND

For providing the content delivery service, a content delivery network (CDN) is known as an information delivery system which is widely used in recent years.

In the information delivery system such as the CDN, a plurality of cache servers connected to an original server are used in order to prevent concentration of access to the origin server and thereby to improve speed of content delivery.

Each of the plurality of cache servers acquires content requested by a certain client from the origin server, delivers the acquired content to the client, and stores it in a storage device included in the cache server. Subsequently, when another client requests to deliver this content, the cache server reads this content from the storage device and delivers the read content to the another client.

Recently, a solid state drive (SSD) including a nonvolatile memory such as a NAND flash memory and a controller that controls the nonvolatile memory has begun to be used as the storage device of the cache server.

There may be a case where a cache server is unable to successfully read content, from a nonvolatile memory in SSD, that has been requested by a client and that has been previously stored in the nonvolatile memory of the SSD. At this time, the cache server may determine that this content does not originally exist in the SSD, instead of determining as an occurrence of a read error. In this case, the cache server acquires such content from the origin server, delivers the acquired content to the client, and writes the acquired content to the nonvolatile memory of the SSD in order to recover the content which was unable to successfully be read.

However, since the nonvolatile memory wears out as a program/erase cycle progresses due to characteristics thereof, there is an upper limit to the number of program/erase cycles (number of rewrites) of the nonvolatile memory, and it is required to control writing to the nonvolatile memory so as not to exceed the upper limit of the number of program/erase cycles.

Therefore, in a cache server using a nonvolatile memory as a cache, a technology capable of suppressing the wear of the nonvolatile memory is required.

BRIEF DESCRIPTION OF THE DRAWINGS

FIG. 1 is a diagram illustrating a configuration example of an information delivery system including a cache server according to an embodiment.

FIG. 7 is a diagram for explaining error detection processing executed in the information delivery system including the cache server according to the embodiment.

FIG. 11 is a diagram illustrating a first example of a delivery capability of the cache server according to the embodiment.

FIG. 12 is a diagram illustrating a second example of the delivery capability of the cache server according to the embodiment.

FIG. 15 is a flowchart illustrating a procedure of a third example of the content recovery processing executed in the cache server according to the embodiment.

FIG. 16 is a flowchart illustrating a procedure of a fourth example of the content recovery processing executed in the cache server according to the embodiment.

FIG. 17 is a flowchart illustrating a procedure of a fifth example of the content recovery processing executed in the cache server according to the embodiment.

FIG. 21 is a flowchart illustrating a procedure of content writing processing executed in the cache server according to the embodiment.

DETAILED DESCRIPTION

Figure 2:
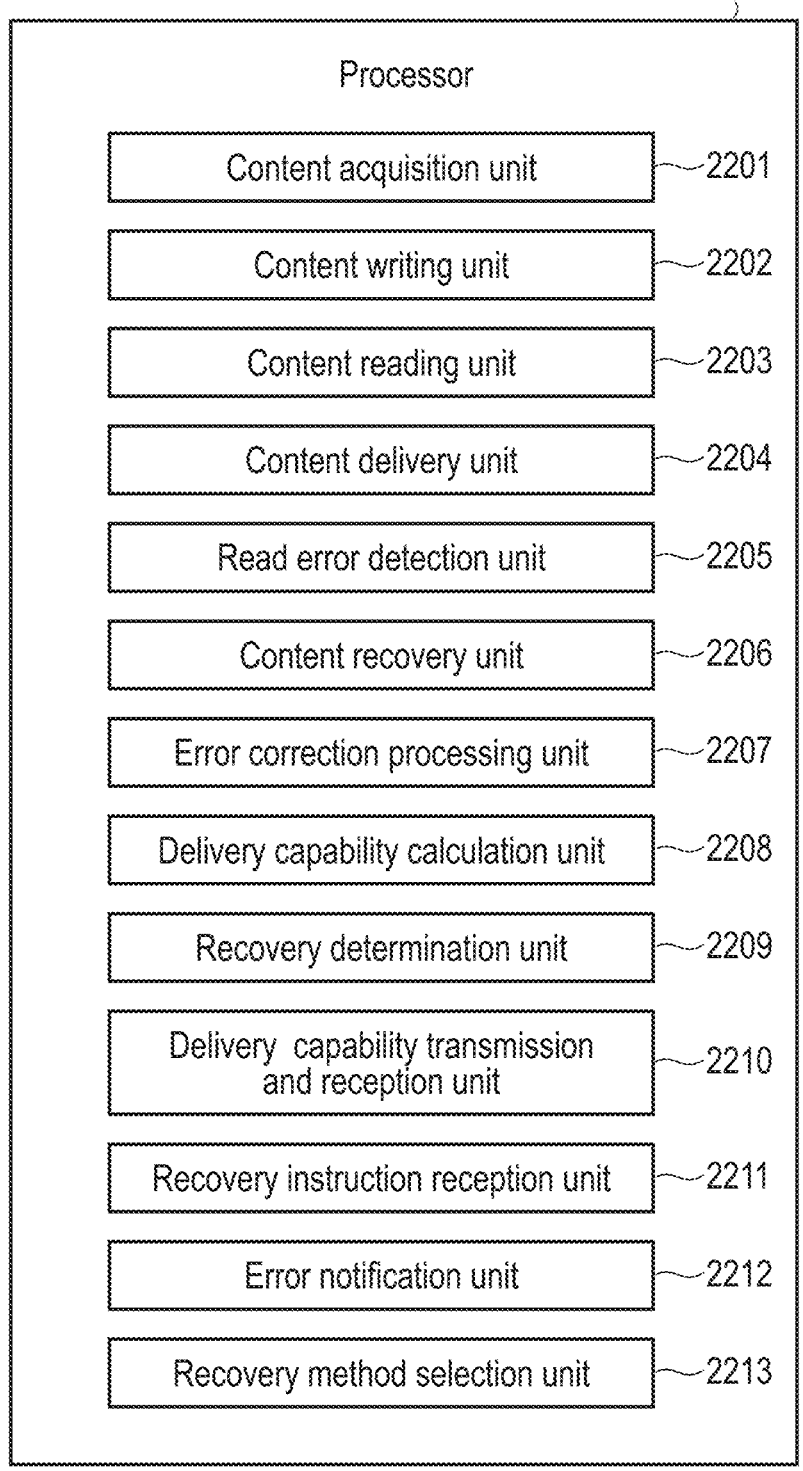
FIG. 2 is a block diagram illustrating a functional configuration example of a processor of the cache server according to the embodiment.

Various embodiments will be described hereinafter with reference to the accompanying drawings.

One embodiment of the present invention provides a cache server capable of suppressing the wear-out of a nonvolatile memory.

In general, according to one embodiment, a cache server is connectable via a network to an origin server that is an external server retaining a plurality of contents. The cache server includes a storage device and a processor. The storage device includes a nonvolatile memory having a finite data retainable period and a finite number of rewrites, and a controller configured to control the nonvolatile memory. The processor is configured to: determine whether or not a first content requested from a client is stored in the nonvolatile memory; in a case where the first content is stored in the nonvolatile memory, execute reading the first content from the nonvolatile memory and delivering the read first content to the client via the network; and, in a case where the first content is not stored in the nonvolatile memory, execute acquiring the first content from the origin server, delivering the acquired first content to the client via the network, and writing the acquired first content in the nonvolatile memory. In a case where an error has occurred in reading the first content from the nonvolatile memory, the processor calculates a delivery capability of the cache server related to a deliverable content stored in the nonvolatile memory, based on at least a predicted number of reads for each deliverable content stored in the nonvolatile memory. The processor determines whether or not the calculated delivery capability exceeds a first reference value. In a case where it is determined that the calculated delivery capability exceeds the first reference value, the processor does not execute recovering the first content. In a case where it is determined that the calculated delivery capability does not exceed the first reference value, the processor executes recovering the first content, delivering the recovered first content to the client via the network, and writing the recovered first content in the nonvolatile memory.

FIG. 1 is a diagram illustrating a configuration example of an information delivery system including a cache server according to the embodiment. The information delivery system is a system that delivers contents to various client terminals (clients 4-1 to 4-4 in FIG. 1) via a network 5 such as the Internet, and is implemented as, for example, a CDN. The information delivery system includes an origin server 1, one or more cache servers 2 (three cache servers 2-1 to 2-3 in FIG. 1), and a control server 3. The network 5 includes, for example, a network 5-1, a network 5-2, and a network 5-3. The origin server 1, the cache server 2-1 to 2-3, the control server 3, and the clients 4-1 to 4-4 are connected via the network 5.

The origin server 1 is a server that retains a plurality of contents. The origin server 1 is also referred to as a delivery server. The content is, for example, a moving image, an image, or any other type of data.

Each of the cache servers 2-1 to 2-3 is a server that temporarily caches contents. Each of the cache servers 2-1 to 2-3 caches the content delivered by the origin server 1. In response to reception of a request from the clients 4-1 to 4-4, the cache servers 2-1 to 2-3 deliver the cached contents to the clients 4-1 to 4-4 instead of the origin server 1. Specifically, each of the cache servers 2-1 to 2-3 determines whether or not a first content requested from the clients 4-1 to 4-4 is cached, reads the first content in a case where the first content is cached, and delivers the read first content to the clients 4-1 to 4-4. In addition, in a case where the requested first content is not cached, the cache servers 2-1 to 2-3 acquire the first content from the origin server 1, deliver the acquired first content to the client, and cache the acquired first content.

The control server 3 is a server that controls the cache server provided in the information delivery system. In the present embodiment, since the information delivery system includes the cache servers 2-1 to 2-3, the control server 3 controls these cache servers 2-1 to 2-3. The control server 3 may function as, for example, a DNS server. The control server 3 functioning as a DNS server converts an URL received from any one of the clients 4-1 to 4-4 into an address (IP address) corresponding to the cache server to be accessed among the cache servers 2-1 to 2-3, and transmits, as a response, the address (IP address) to the client. In addition, any server outside the control server 3 may function as the DNS server. Furthermore, the control server 3 may function as a load balancer that selects a cache server that performs a content delivery service from the cache servers 2-1 to 2-3.

The clients 4-1 to 4-4 are client terminals that use contents. The client is, for example, a car (or an in-vehicle device), a computer, a game machine, or a smartphone (or a portable phone). Each of the clients 4-1 to 4-4 transmits a request designating a certain content to any one of the cache servers 2-1 to 2-3 via the network 5-1. Specifically, each of the clients 4-1 to 4-4 transmits a request to a cache server designated by an address acquired from the DNS server.

Next, a configuration example of the cache server will be described. Here, a configuration example of the cache server 2-1 will be described, but the other cache servers 2-2 and 2-3 also have the similar configuration to the cache server 2-1.

The cache server 2-1 includes a network interface controller (NIC) 21, a processor 22, a main memory 23, and a plurality of solid state drives (SSDs) 24-1 to 24-4. The NIC 21, the processor 22, the main memory 23, and the SSDs 24-1 to 24-4 are connected to each other via a bus 20.

The NIC 21 is an interface circuit. The NIC 21 executes communication with each of an external client (clients 4-1 to 4-4) and an external server (for example, the control server 3, the origin server 1, and other cache servers 2-2 to 2-3) via the network 5.

The processor 22 is a central processing unit (CPU). The processor 22 controls the operation of the entirety of the cache server 2-1 by controlling each component of the cache server 2-1. The processor 22 executes software (host software) loaded from the SSDs 24-1 to 24-4 or another storage device connected to the cache server 2-1 into the main memory 23. The host software includes, for example, an operating system, a file system, and an application program.

The main memory 23 is a volatile memory. The main memory 23 is, for example, a dynamic random access memory (DRAM). A part of a storage area of the main memory 23 is used as a data buffer. The data buffer temporarily stores contents to be written to the SSDs 24-1 to 24-4 or contents read from the SSDs 24-1 to 24-4. In addition, another storage area of the main memory 23 is used to store a content management table 231, for example. The content management table 231 is a table for managing each content cached in the cache server 2-1. The content management table 231 retains management information corresponding to each content stored in each of the plurality of SSDs 24-1 to 24-4 in the cache server 2-1. Management information corresponding to a certain content includes, for example, information for identifying this content, a size of this content, address information indicating a storage area in which this content is stored, a predicted number of reads of this content, a data retention request period of this content, a remaining data retention request period of this content, and the like.

The predicted number of reads of a certain content is a predicted value of the number of requests for designating this content as a delivery target content, and details thereof will be described later.

The data retention request period of a certain content is a period in which this content is retained (cached) in a nonvolatile memory 242. The data retention request period of the certain content may be designated by a distribution source (i.e. a distributor) of this content or the origin server 1. Alternatively, the data retention request period of the certain content may be determined based on the capacity of the nonvolatile memory 242, the amount of data written in the nonvolatile memory 242 per predetermined period, a data exchange algorithm for determining a content to be excluded from the nonvolatile memory 242, and the like.

The remaining data retention request period of a certain content is a remaining period in which this certain content is retained (cached) in the nonvolatile memory 242. That is, the remaining data retention request period of the certain content may be determined by subtracting an elapsed time after this content is written in the nonvolatile memory 242 from the data retention request period of this content.

As explained, the data retention request period of the certain content may be designated by the distribution source (i.e., the distributor) or the origin server 1 (for simplicity, called as a designated period), or may be determined based on the capacity, the amount of data, the data exchange algorithm and the like (for simplicity, called as a determined period). So the remaining data retention request period of this content may be obtained by subtracting an elapsed time after this content has been written in the nonvolatile memory 242 from the designated period or the determined period.

Here, the data exchange algorithm, for example, a first-in first-out (FIFO) method or a least recently used (LRU) method can be used. In the FIFO method, for example, it is assumed that the capacity (user capacity) of the nonvolatile memory 242 is 10 TB and the amount of data written in the nonvolatile memory 242 per day is 1 TB. In this case, when a certain content has been written in the nonvolatile memory 242 nine days before, the remaining data retention request period of this content will be one day.

The SSDs 24-1 to 24-4 are storage devices. The nonvolatile memory of each of the SSDs 24-1 to 24-4 is used as a cache that stores one or more contents. Although FIG. 2 illustrates a case where each cache server 2 includes a plurality of SSDs as storage devices, as an example, each cache server 2 may include only one SSD 23 as a storage device.

Next, a configuration example of the storage device will be described. Here, a configuration example of the SSD 24-1 will be described, but the other SSDs 24-2 to 24-4 also have the similar configuration to the SSD 24-1.

The SSD 24-1 includes a controller 241 and the nonvolatile memory 242. The controller 241 is a control circuit that controls the nonvolatile memory 242. The controller 241 writes data to the nonvolatile memory 242 or reads data from the nonvolatile memory 242, based on a command received from the processor 22, for example.

An example of the nonvolatile memory 242 is, for example, a NAND flash memory. The nonvolatile memory 242 may be a flash memory having a two-dimensional structure or having a three-dimensional structure. The nonvolatile memory 242 has a finite data retainable period and a finite number of rewrites. Here, the finite data retainable period and the finite number of rewrites will be described.

The data retainable period of the nonvolatile memory 242 is a period in which data written in the nonvolatile memory 242 can be retained on the nonvolatile memory 242. The data retainable period is also referred to as a data retention period. The data retainable period is determined based on the degree of wear-out of the nonvolatile memory 242. As the degree of wear-out increases, the data retainable period tends to decrease.

The number of rewrites of the nonvolatile memory 242 is a program/erase (P/E) cycle count in the nonvolatile memory 242. Since the nonvolatile memory 242 wears out due to characteristics thereof as the P/E cycle progresses, the number of rewrites (the P/E cycle count) of the nonvolatile memory 242 has an upper limit. Specifically, a data erasing operation is executed in units of blocks included in the nonvolatile memory 242, and a data writing operation is executed in units of pages included in each block. Since each block wears out by rewriting (data erasing operation and thereafter data writing operation repeatedly, and the like) due to characteristics thereof, the number of rewrites of each block has an upper limit. The number of rewrites of each block is also referred to as the P/E cycle count of the block.

The controller 241 includes an error correction circuit 2413. The error correction circuit 2413 adds an error correction code (ECC) to a content to be written in the nonvolatile memory 242. The error correction circuit 2413 executes error correction processing to detect and correct an error included in the read content, by using the ECC, when reading the content from the nonvolatile memory 242. If the error correction processing has been normally executed, the error correction circuit 2413 transmits the content to the processor 22 by the controller 241. If the error correction processing has not been normally executed, for example because of a reason that the read content includes error bits exceeding the number of correctable error bits, the error correction circuit 2413 notifies the processor 22 that an error (read error) has occurred in reading the content.

Next, a functional configuration example of the processor 22 will be described. FIG. 2 is a block diagram illustrating the functional configuration example of the processor 22 according to the embodiment.

The processor 22 includes a content acquisition unit 2201, a content writing unit 2202, a content reading unit 2203, a content delivery unit 2204, a read error detection unit 2205, a content recovery unit 2206, an error correction processing unit 2207, a delivery capability calculation unit 2208, a recovery determination unit 2209, a delivery capability transmission and reception unit 2210, a recovery instruction reception unit 2211, an error notification unit 2212, and a recovery method selection unit 2213. Some or all of the content acquisition unit 2201, the content writing unit 2202, the content reading unit 2203, the content delivery unit 2204, the read error detection unit 2205, the content recovery unit 2206, the error correction processing unit 2207, the delivery capability calculation unit 2208, the recovery determination unit 2209, the delivery capability transmission and reception unit 2210, the recovery instruction reception unit 2211, the error notification unit 2212, and the recovery method selection unit 2213 may be realized by dedicated firmware or dedicated hardware in the cache server 2-1. The units 2201, 2202, 2203, . . . , 2213 of the processor 22 may dividedly be located in the cache server 2-1.

The content acquisition unit 2201 executes acquiring contents from another server. The other server includes, for example, the origin server 1, and the cache server 2-2 and the cache server 2-3 other than the cache server 2-1. In a case where the first content is requested from any one of the clients 4-1 to 4-4 and the first content is not stored in the SSDs 24-1 to 24-4, the content acquisition unit 2201 executes acquiring the first content from the origin server 1. In addition, in a case where an error (read error) has occurred in reading the first content from the nonvolatile memory 242, the content acquisition unit 2201 executes acquiring the first content from another server (origin server 1 or another cache server).

The content writing unit 2202 executes writing contents into the SSDs 24-1 to 24-4. In the writing, the content writing unit 2202 transmits a write command for writing a content to any one of the SSDs 24-1 to 24-4. For example, when the cache server 2-1 acquires a new content, the content writing unit 2202 specifies an SSD as a writing destination of this content among the SSDs 24-1 to 24-4, and issues a write command for writing this content to the specified SSD.

The content reading unit 2203 executes reading a content to be read from any one of the SSDs 24-1 to 24-4. The content reading unit 2203 specifies an SSD that stores a content to be read among the SSDs 24-1 to 24-4, and transmits a read command for reading the content to be read to the specified SSD. For example, in a case where the first content is requested from any one of the clients 4-1 to 4-4 and the first content is stored in the SSD 24-1, the content reading unit 2203 executes reading the first content from the SSD 24-1. At this time, the content reading unit 2203 transmits a read command for designating the first content to the SSD 24-1.

The content delivery unit 2204 executes delivering contents. For example, the content delivery unit 2204 delivers a content requested from any one of the clients 4-1 to 4-4 to this client via the network 5-1.

The read error detection unit 2205 receives a notification indicating a read error from one of the SSDs 24-1 to 24-4 that have issued the read command, thereby detecting that an error (read error) has occurred in reading the content from the nonvolatile memory 242 of this SSD.

The content recovery unit 2206 executes recovering the content in which the read error has occurred. Here, the recovery processing of recovering the content in which the read error has occurred is processing of recovering the content into a state in which the content is normally readable from the nonvolatile memory 242. In the recovery processing, the content recovery unit 2206 causes the content acquisition unit 2201 to execute acquiring a content from another server (origin server 1 or another cache server). Alternatively, in the recovery processing, the content recovery unit 2206 causes the error correction processing unit 2207 to execute error correction processing for recovering the content in which the read error has occurred.

The error correction processing unit 2207 executes error correction processing. The error correction processing executed in the error correction processing unit 2207 has a higher error correction capability than the error correction processing executed by the error correction circuit 2413 in the controller 241 of each of at least the SSDs 24-1 to 24-4. For example, the error correction processing unit 2207 executes error correction processing different from the error correction processing executed in the controller 241 of each of the SSDs 24-1 to 24-4 by using data read from the SSDs 24-1 to 24-4, thereby recovering the content in which the read error has occurred. Details of the error correction process executed by the error correction processing unit 2207 will be described later with reference to FIG. 5.

The delivery capability calculation unit 2208 calculates a delivery capability of the cache server 2-1. The delivery capability of the cache server 2-1 is a capability of the cache server 2-1 related to a deliverable content stored in the nonvolatile memory 242 of each of the SSDs 24-1 to 24-4. That is, the value indicating the capability of the cache server 2-1 with which the cache server 2-1 can directly deliver the content to any client 4 by using the deliverable content stored in the nonvolatile memory 242 of its own self is the delivery capability of the cache server 2-1. In a case where a read error of a certain content has occurred, the content is not a deliverable content until the content is recovered. Therefore, in calculating the delivery capability of the cache server 2-1 immediately after the read error of a certain content has occurred, the content in which the read error has occurred is excluded. The delivery capability of the cache server 2-1 indicates, for example, (A) the total number of contents expected to be delivered by the cache server 2-1 to any client 4 per unit time by using the deliverable content stored in the nonvolatile memory 242 of its own self, (B) the total data size of the content expected to be delivered by the cache server 2-1 per unit time by using the deliverable content stored in the nonvolatile memory 242 of its own self, or (C) the total number of contents expected to be delivered by the cache server 2-1 to any client 4 until the data retention request period of each deliverable content expires, by using the deliverable content stored in the nonvolatile memory 242 of its own self. The delivery capability of the cache server 2-1 is calculated, for example, when any one of the following events (1) to (3) has occurred.

(1) When the cache server 2-1 acquires a new content from the origin server 1.
 (2) When the cache server 2-1 detects the occurrence of an error (read error) in reading a content from the nonvolatile memory 242.
 (3) When the cache server 2-1 recovers the content in which the read error has occurred and writes the recovered content to the nonvolatile memory 242.

The delivery capability calculation unit 2208 calculates the delivery capability of the cache server 2-1 based on at least the predicted number of reads of each deliverable content stored in the nonvolatile memory 242. The predicted number of reads is different for each deliverable content. For example, the predicted number of reads (predicted number of requests) of a highly popular content may be set to a relatively large value, and the predicted number of reads (predicted number of requests) of an unpopular content may be set to a relatively low value. The predicted number of reads of each content may be the predicted number of reads per unit time (for example, the predicted number of reads per second), or may be a total predicted number of reads in the data retention request period (or the remaining data retention request period) of each content.

The predicted number of reads per unit time of a certain content may be a value designated by the origin server 1 or a distribution source (i.e., a distributor) of the content.

Alternatively, the processor 22 of the cache server 2-1 may measure the number of requests for each content. In this case, the predicted number reads per unit time of a certain content may be the number of requests per unit time of the latest content.

For example, the delivery capability calculation unit 2208 may calculate, as the delivery capability of the cache server 2-1, the sum of predicted numbers of times of reading of respective deliverable contents stored in the nonvolatile memory 242. In this case, the predicted number of reads of each deliverable content may be the predicted number of reads per unit time, or may be the total predicted number of reads in the data retention request period (or the remaining data retention request period). In a case where the delivery capability calculation unit 2208 calculates the delivery capability of the cache server 2-1 by using the predicted number reads per unit time, the calculated delivery capability of the cache server 2-1 indicates (A) described above, that is, the total number of contents expected to be delivered to any client 4 per unit time by the cache server 2-1 by using the deliverable content stored in the nonvolatile memory 242.

In addition, for example, the delivery capability calculation unit 2208 may calculate, as the delivery capability of the cache server 2-1, the sum of products of the predicted number of reads of each deliverable content stored in the nonvolatile memory 242 and the data size of each deliverable content. In this case, the predicted number of reads of each deliverable content may be the predicted number of reads per unit time, or may be the total predicted number of reads in the data retention request period (or the remaining data retention request period). In a case where the delivery capability calculation unit 2208 calculates the delivery capability of the cache server 2-1 by using the predicted number of reads per unit time, the calculated delivery capability of the cache server 2-1 indicates (B) described above, that is, the total data size of contents expected to be delivered per unit time by the cache server 2-1 by using the deliverable content stored in the nonvolatile memory 242.

In addition, for example, the delivery capability calculation unit 2208 may calculate, as the delivery capability of the cache server 2-1, the sum of products of the predicted number reads of each deliverable content stored in the nonvolatile memory 242 and the remaining data retention request period corresponding to each deliverable content. In this case, the predicted number of reads of each deliverable content is the predicted number of reads per unit time. Thus, in this case, the delivery capability of the cache server 2-1 calculated by the delivery capability calculation unit 2208 indicates (C) described above, that is, the total number of contents expected to be delivered to any client 4 by the cache server 2-1 until the data retention request period of each deliverable content expires, by using the deliverable content stored in the nonvolatile memory 242.

The recovery determination unit 2209 determines whether or not to recover the content in which the read error has occurred. The recovery determination unit 2209 compares the delivery capability calculated by the delivery capability calculation unit 2208 with a first reference value.

The first reference value is a threshold value used to evaluate the delivery capability of the cache server 2-1. The first reference value can be determined based on the delivery capability required for the cache server 2-1 to improve the content delivery speed in the information delivery system. For example, in a case where the calculated delivery capability of the cache server 2-1 indicates (A) described above, that is, the total number of contents expected to be delivered to any client 4 per unit time by the cache server 2-1, the first reference value may be determined based on a target value of the total number of contents delivered per unit time, which is obtained by the cache server 2-1. In addition, in a case where the calculated delivery capability of the cache server 2-1 indicates (B) described above, that is, the total data size of the content expected to be delivered per unit time by the cache server 2-1, the first reference value may be determined based on a target value of the total data size of the content delivered per unit time, which is obtained by the cache server 2-1. Furthermore, in a case where the calculated delivery capability of the cache server 2-1 indicates (C) described above, that is, the total number of contents expected to be delivered to any client 4 by the cache server 2-1 before the data retention request period of each deliverable content expires, the first reference value may be determined based on a target value of the total number of contents delivered before the data retention request period of each deliverable content expires, which is obtained by the cache server 2-1. In the information delivery system, it may also be possible to change a reference value, depend on a situation according to In a case where the calculated delivery capability exceeds the first reference value, the recovery determination unit 2209 determines that the recovery of the content in which the read error has occurred is unnecessary. This is because it can be estimated that sufficient delivery capability remains in the cache server 2-1 even though the content in which the read error has occurred is not recovered. The cache server 2-1 may transfer a request for designating the content in which the read error has occurred to another cache server. Alternatively, instead of the cache server 2-1, the control server 3 may determine another cache server that delivers the requested content (that is, the content in which the read error has occurred) and instruct the determined cache server to deliver the requested content.

On the other hand, in a case where the calculated delivery capability does not exceed the first reference value, the recovery determination unit 2209 determines that it is necessary to recover the content in which the read error has occurred. This is because it can be estimated that sufficient delivery capability does not remain in the cache server 2-1.

Furthermore, the recovery determination unit 2209 may determine whether or not to recover the content in which the read error has occurred, based on not only the delivery capability of the cache server 2-1, but both the delivery capability of the cache server 2-1 and the degree of wear-out of the nonvolatile memory 242 in the cache server 2-1.

More specifically, in a case where the calculated delivery capability of the cache server 2-1 is equal to or less than the first reference value, the recovery determination unit 2209 further compares the degree of wear-out of the nonvolatile memory 242 in the cache server 2-1 with a second reference value. The degree of wear-out of the nonvolatile memory 242 corresponds to, for example, the P/E cycle count in the nonvolatile memory 242. In a case where it is determined that the degree of wear-out exceeds the second reference value, the recovery determination unit 2209 determines that recovery of the content in which the read error has occurred is unnecessary. As a result, it is possible to prevent an occurrence of a situation in which the degree of wear-out of the nonvolatile memory 242 becomes too high. On the other hand, in a case where the degree of wear-out is equal to or less than the second reference value, the recovery determination unit 2209 determines that it is necessary to recover the content in which the read error has occurred.

The second reference value is a threshold value used to evaluate the degree of wear-out of the nonvolatile memory 242. In a case where the degree of wear-out of the nonvolatile memory 242 is determined based on the P/E cycle count (number of rewrites) of the nonvolatile memory 242, the second reference value may be determined based on a value obtained by subtracting a predetermined number from the total number of P/E cycles allowed in the nonvolatile memory 242 or a value obtained by multiplying the total number of P/E cycles allowed in the nonvolatile memory 242 by a predetermined coefficient of 1 or less. In addition, in a case where the degree of wear-out of the nonvolatile memory 242 is determined based on a ratio of the P/E cycle count of the nonvolatile memory 242 to the total number of P/E cycles allowed in the nonvolatile memory 242, the second reference value may be determined based on a predetermined percentage less than 100%. In addition, in a case where the degree of wear-out of the nonvolatile memory 242 is determined based on the total amount of data written in the nonvolatile memory 242, the second reference value may be determined based on a value obtained by subtracting a predetermined number from the total amount of data writable in the nonvolatile memory 242 or a value obtained by multiplying the total amount of data writable in the nonvolatile memory 242 by a predetermined coefficient of 1 or less. In addition, in a case where the degree of wear-out of the nonvolatile memory 242 is determined based on a ratio of the total amount of data written in the nonvolatile memory 242 to the total amount of data writable in the nonvolatile memory 242, the second reference value may be determined based on a predetermined percentage less than 100%.

In addition, instead of comparison between the delivery capability of the cache server 2-1 and the first reference value, the recovery determination unit 2209 may compare the delivery capability of the entirety of a plurality of cache servers 2 including the cache server 2-1 and one or more other cache servers (here, the cache server 2-2 and the cache server 2-3) with a predetermined reference value. The delivery capability of the entirety of the plurality of cache servers 2 can be calculated by respective delivery capabilities of which the cache server 2-1 is received from each of the cache server 2-2 and the cache server 2-3 and the delivery capability of the cache server 2-1 by itself.

In a case where the calculated delivery capability of the entirety of the plurality of cache servers 2 exceeds the predetermined reference value, the recovery determination unit 2209 determines that the recovery of the content in which the read error has occurred is unnecessary. This is because it can be estimated that sufficient delivery capability remains in the entirety of the plurality of cache servers 2 even though the content in which the read error has occurred is not recovered. The cache server 2-1 may transfer a request for designating the content in which the read error has occurred to another cache server. Alternatively, instead of the cache server 2-1, the control server 3 may determine another cache server that delivers the requested content (that is, the content in which the read error has occurred) and instruct the determined cache server to deliver the requested content.

On the other hand, in a case where the calculated delivery capability of the entirety of the plurality of cache servers 2 does not exceed the predetermined reference value, the recovery determination unit 2209 determines that it is necessary to recover the content in which the read error has occurred. This is because it can be estimated that sufficient delivery capability does not remain in the entirety of the plurality of cache servers 2.

Furthermore, the recovery determination unit 2209 may determine whether or not to recover the content in which the read error has occurred, based on not only the delivery capability of the entirety of the plurality of cache servers 2, but both the delivery capability of the entirety of the plurality of cache servers 2 and the degree of wear-out of the nonvolatile memory 242 in the cache server 2-1.

More specifically, in a case where the calculated delivery capability of the entirety of the plurality of cache servers 2 is equal to or less than the predetermined reference value, the recovery determination unit 2209 further compares the degree of wear-out of the nonvolatile memory 242 in the cache server 2-1 with a second reference value. In a case where it is determined that the degree of wear-out exceeds the second reference value, the recovery determination unit 2209 determines that recovery of the content in which the read error has occurred is unnecessary. As a result, it is possible to prevent an occurrence of a situation in which the degree of wear-out of the nonvolatile memory 242 becomes too high. On the other hand, in a case where the degree of wear-out is equal to or less than the second reference value, the recovery determination unit 2209 determines that it is necessary to recover the content in which the read error has occurred.

Furthermore, the recovery determination unit 2209 may determine whether or not to recover the content in which the read error has occurred, based on a recovery instruction received from the control server 3.

The delivery capability transmission and reception unit 2210 executes processing of transmitting the calculated delivery capability of the cache server 2-1 to each of the other cache servers 2-2 and 2-3 directly or via the control server 3, and processing of receiving the delivery capability of each of the other cache servers 2-2 and 2-3 from each of the other cache servers 2-2 and 2-3 directly or via the control server 3. The configuration in which the cache servers 2-1, 2-2, and 2-3 directly exchange their own distribution capabilities allows the cache servers 2-1, 2-2, and 2-3 to share their distribution capabilities even in an information delivery system in which the control server 3 is not provided. In the information delivery system in which the control server 3 is provided, the delivery capability transmission and reception unit 2210 may notify only the control server 3 of the delivery capability of the cache server 2-1, and the control server 3 may notify each of the other cache servers 2-2 and 2-3 of the delivery capability of the cache server 2-1. In addition, in the information delivery system in which the control server 3 is provided, the delivery capability transmission and reception unit 2210 may receive the delivery capability of each of the other cache servers 2-2 and 2-3 from the control server 3.

A configuration in which the control server 3 calculates the delivery capability of the entirety of a plurality of cache servers 2 including the cache servers 2-1, 2-2, and 2-3, and notifies each of the cache servers 2-1, 2-2, and 2-3 of the calculated delivery capability of the entirety of the plurality of cache servers 2.

The recovery instruction reception unit 2211 receives a recovery instruction from the control server 3. The recovery instruction includes information for an instruction to recover a predetermined content. The predetermined content designated by the recovery instruction is content to be recovered. The content to be recovered is, for example, a content in which a read error has occurred. The control server 3 is notified of the content in which the read error has occurred by an error notification unit 2212 to be described later. Furthermore, the content to be recovered may be other contents than the content in which the read error has occurred.

The error notification unit 2212 notifies the control server 3 of an occurrence of a read error of a content and information for identifying the content in which the reading error has occurred. Furthermore, the error notification unit 2212 may notify the control server 3 of not only the occurrence of the read error of the content and the information for identifying the content in which the read error has occurred but also either or both of information indicating the details of the read error that has occurred and information indicating the degree of wear-out of the nonvolatile memory 242.

The recovery method selection unit 2213 selects a method of recovery processing executed in the content recovery unit 2206. In the recovery processing of recovering the content in which the read error has occurred, the recovery method selection unit 2213 selects either of first recovery processing of acquiring the content in which the read error has occurred from another server via the network 5 and second recovery processing of recovering the content in which the read error has occurred by the error correction processing. The other server is, for example, the origin server 1. Either or both of the other cache servers 2-2 and 2-3 may cache the same content as the content in which the read error has occurred. In this case, the recovery method selection unit 2213 may select, as the first recovery processing, recovery processing of acquiring the same content as the content in which the read error has occurred, from one of the cache servers 2-2 and 2-3, specifically, one other cache server that caches the same content as the content in which the read error has occurred.

The content recovery unit 2206 recovers the content in which the read error has occurred, by executing the recovery processing selected by the recovery method selection unit 2213.

Figure 3:
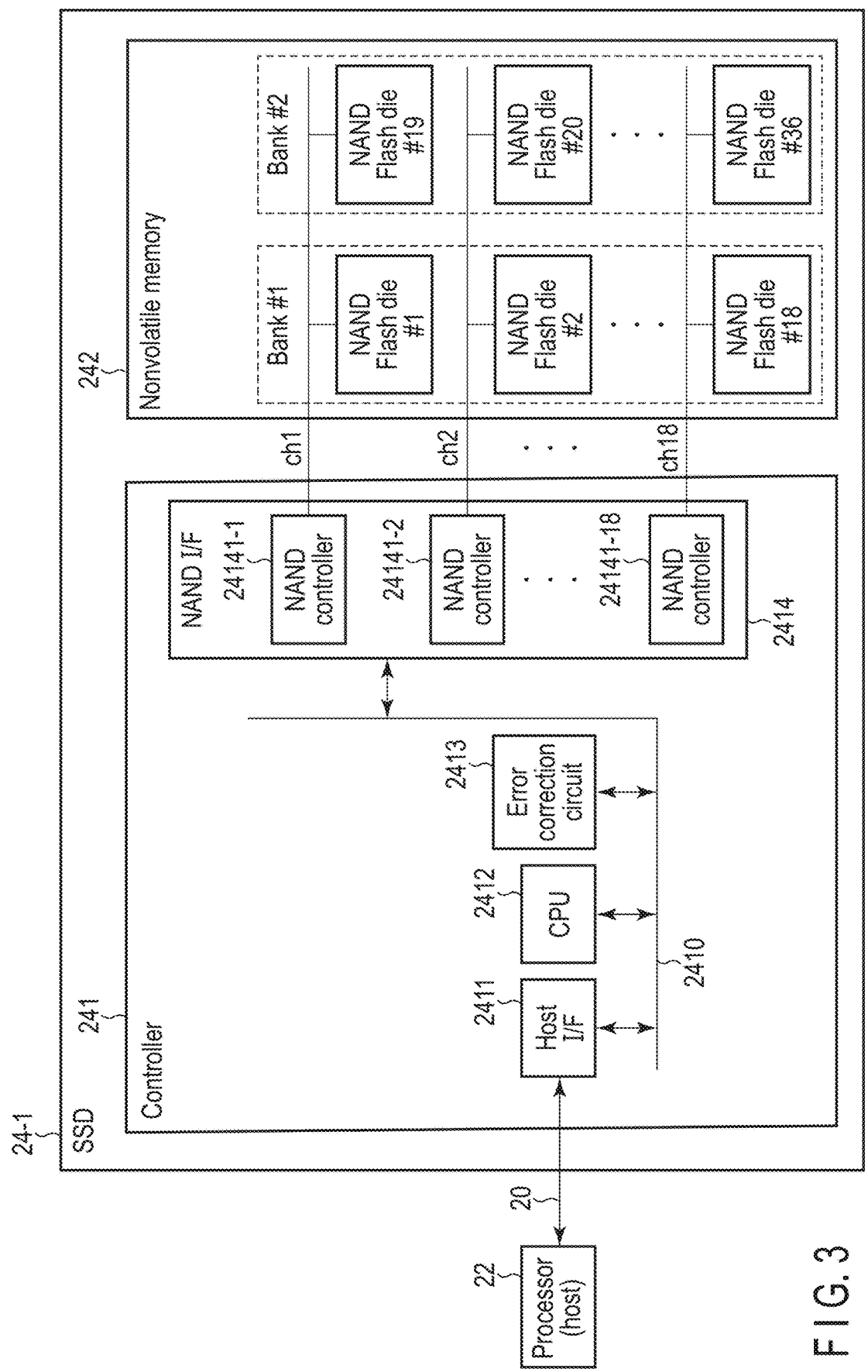
FIG. 3 is a block diagram illustrating a configuration example of a storage device of the cache server according to the embodiment.

Next, a detailed configuration of the storage device will be described. FIG. 3 is a block diagram illustrating a configuration example of the storage device of the cache server according to the embodiment. Although FIG. 3 illustrates a detailed configuration example of the SSD 24-1 of the cache server 2-1, the other SSDs 24-2 to 24-4 of the cache server 2-1 also have the same configuration as the SSD 24-1. In addition, each SSD included in each of the other cache servers 2-2 and 2-3 has the same configuration as the SSD 24-1.

The SSD 24-1 includes the controller 241 and the nonvolatile memory 242.

The controller 241 is a memory controller. The controller 241 is, for example, a control circuit such as a System-on-a-Chip (SoC). The controller 241 is electrically connected to the nonvolatile memory 242. The controller 241 processes each of I/O commands received from the processor 22. These I/O commands include a write command that is a command for writing data to the nonvolatile memory 242 of the SSD 24-1, a read command that is a command for reading data from the nonvolatile memory 242, and the like. From the viewpoint of the SSD 24-1, the processor 22 is an external host (host processor). Upon receiving a write command from the processor 22, the controller 241 executes processing of writing data in the nonvolatile memory 242. Upon receiving a read command from the processor 22, the controller 241 executes processing of reading data from the nonvolatile memory 242. As a physical interface that connects the controller 241 and the nonvolatile memory 242, for example, a Toggle NAND flash interface or an open NAND flash interface (ONFI) is used. Each function of the controller 241 can be realized by dedicated hardware, a processor that executes a program, or a combination of the dedicated hardware and the processor.

The nonvolatile memory 242 is a nonvolatile semiconductor memory. The nonvolatile memory 242 includes, for example, a plurality of nonvolatile memory dies. The nonvolatile memory die is also referred to as a nonvolatile memory chip. Each of the plurality of nonvolatile memory dies is, for example, a NAND flash memory die. The nonvolatile memory die is also referred to as a NAND flash die or simply a die below.

Next, an internal configuration of the controller 241 will be described. The controller 241 includes, for example, a host interface (host I/F) 2411, a CPU 2412, an error correction circuit 2413, and a NAND interface 2414. These components are connected to each other via an internal bus 2410.

The host interface 2411 is a communication interface circuit that executes communication with the processor 22 (host processor). The host interface 2411 is realized by, for example, a PCIe controller.

The CPU 2412 is a processor that controls each component of the controller 241. The CPU 2412 executes various types of processing by executing a control program (firmware) stored in the nonvolatile memory 242 or a ROM (not illustrated).

The error correction circuit 2413 executes encoding processing when data is written in the nonvolatile memory 242. In the encoding processing, the error correction circuit 2413 adds an error correction code (ECC) as a redundant code to data to be written in the nonvolatile memory 242. When data is read from the nonvolatile memory 242, the error correction circuit 2413 executes decoding processing. In the decoding processing, the error correction circuit 2413 executes error correction of the data by using the ECC added to the data read from the nonvolatile memory 242. In a case where the number of error bits included in the data is more than the number of error bits correctable by the correction circuit 2413, the error correction circuit 2413 notifies the processor 22 that an error has occurred in reading the data. This error is referred to as a read error.

The NAND interface 2414 is a circuit that controls the nonvolatile memory 242. The NAND interface 2414 is electrically connected to a plurality of NAND flash dies included in the nonvolatile memory 242.

Next, an example of an internal configuration of the nonvolatile memory 242 will be described.

FIG. 3 illustrates an example in which the nonvolatile memory 242 includes 36 NAND flash dies #1 to #36. The individual NAND flash dies are independently operable. Therefore, the NAND flash die functions as a unit that can operate in parallel. The NAND interface 2414 includes, for example, NAND controllers 24141-1, 24141-2, . . . , and 24141-18. The NAND controllers 24141-1, 24141-2, . . . , and 24141-18 are connected to channels ch1, ch2, . . . , and ch18, respectively. Each of the NAND controllers 24141-1, 24141-2, . . . , 24141-18 is connected to one or a plurality of NAND flash dies via the corresponding channel. FIG. 3 illustrates a case where two NAND flash dies are connected to each of the channels ch1, ch2, . . . , and ch18. In this case, the NAND controller 24141-1 is connected to the NAND flash dies #1 and #19 via the channel ch1. The NAND controller 24141-2 is connected to the NAND flash dies #2 and #20 via the channel ch2. The NAND flash dies #1, #2, . . . , and #18 are handled as a bank #1 by the controller 241. The NAND flash dies #19, #20, . . . , and #36 are handled as a bank #2 by the controller 241. The bank is a unit in which a plurality of NAND flash dies are operated in parallel by an interleaving operation.

Figure 4:
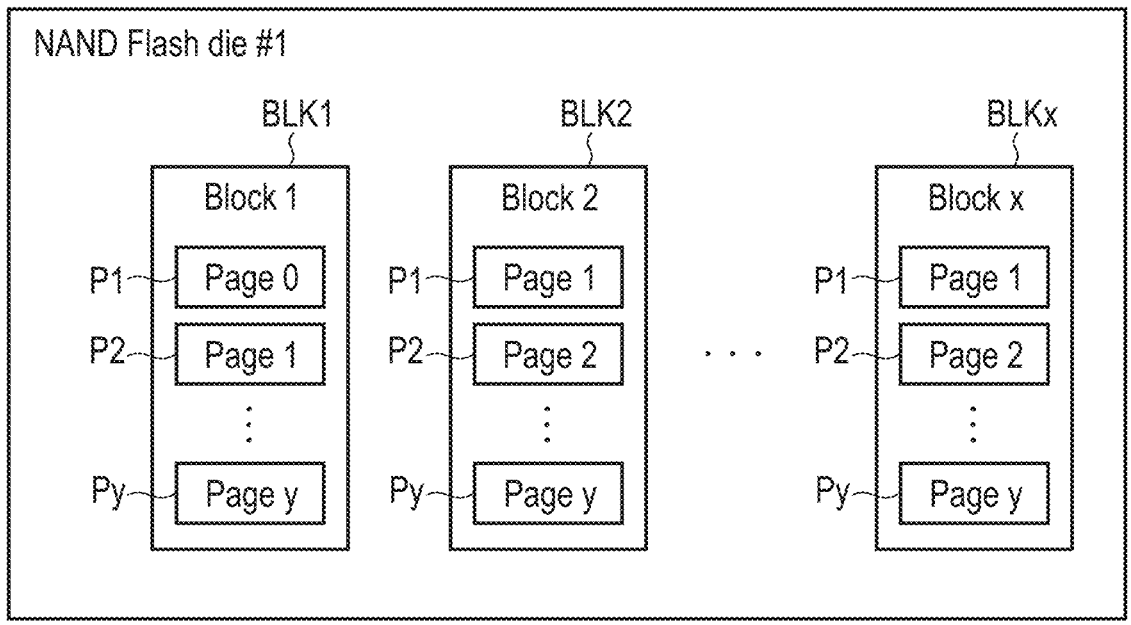
FIG. 4 is a block diagram illustrating a configuration example of a nonvolatile memory die according to the embodiment.

Next, a configuration example of the NAND flash die will be described. FIG. 4 is a block diagram illustrating a configuration example of the NAND flash die according to the embodiment. Although FIG. 4 illustrates a configuration example of the NAND flash die #1, other NAND flash dies also have the similar configuration to the NAND flash die #1.

The NAND flash die #1 includes a plurality of blocks (BLK1, BLK2, . . . , BLKx). Each block BLK is a minimum unit of a data erasing operation. Each of the plurality of blocks includes a plurality of pages (P1, P2, . . . , Py). The page is a unit of a data writing operation and a data reading operation. The page includes a set of memory cells connected to the same word line. The page is also referred to as a physical page.

Figure 5:
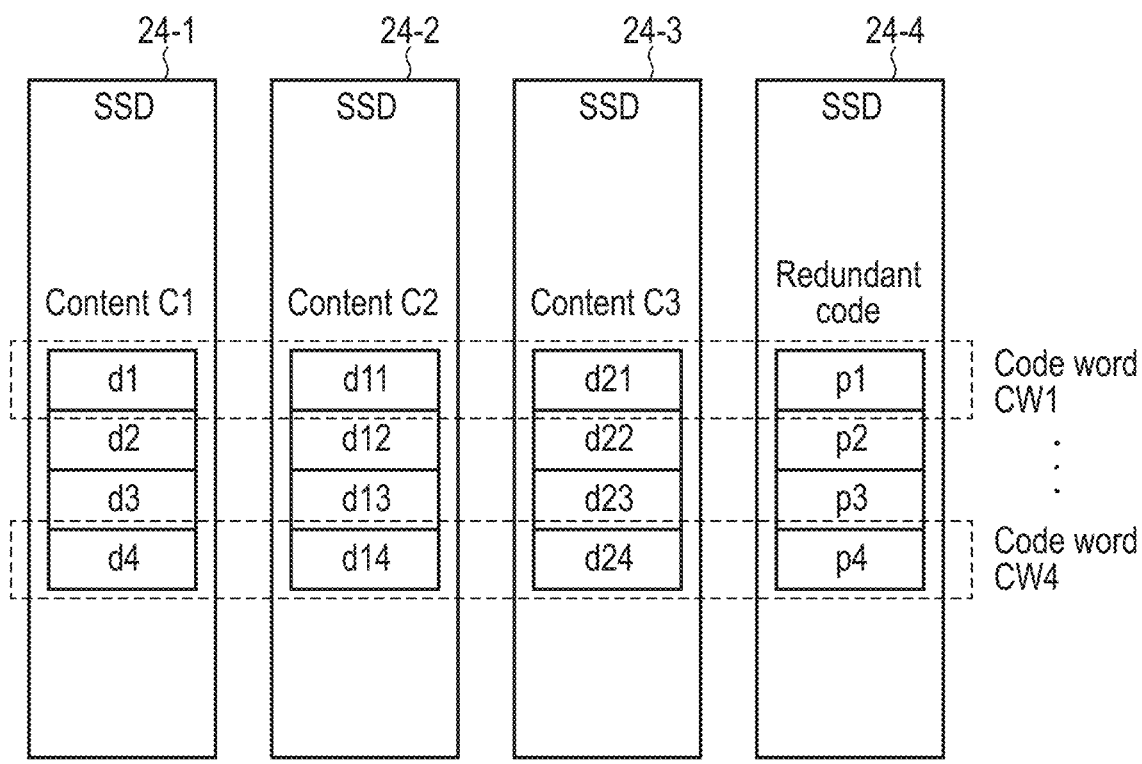
FIG. 5 is a diagram illustrating an example of error correction executed in the cache server according to the embodiment.

Next, error correction processing in the cache server 2-1 will be described. FIG. 5 is a diagram illustrating an example of error correction processing executed in the cache server 2-1 according to the embodiment.

In FIG. 5, a content C1 is stored in the SSD 24-1, a content C2 is stored in the SSD 24-2, a content C3 is stored in the SSD 24-3, and a redundancy code is stored in the SSD 24-4.

The content C1 includes data d1, data d2, data d3, and data d4. The content C2 includes data d11, data d12, data d13, and data d14. The content C3 includes data d21, data d22, data d23, and data d24. The redundancy code includes parity p1, parity p2, parity p3, and parity p4.

The data d1, the data d11, the data d21, and the parity p1 constitute a code word CW1. The data d2, the data d12, the data d22, and the parity p2 constitute a code word CW2. The data d3, the data d13, the data d23, and the parity p3 constitute a code word CW3. The data d4, the data d14, the data d24, and the parity p4 constitute a code word CW4.

The processor 22 may generate a redundancy code when writing the content C1, the content C2, and the content C3. The processor 22 may write the content C1, the content C2, the content C3, and the redundancy code to each SSD in parallel. For example, the processor 22 may perform the writing of the code word CW1 by executing, in parallel, a process of transmitting to the SSD 24-1 a write command for writing the data d1, a process of transmitting to the SSD 24-2 a write command for writing the data d11, a process of transmitting to the SSD 24-3 a write command for writing the data d21, and a process of transmitting to the SSD 24-4 a write command for writing the parity p1. In the similar manner, the processor 22 can write the code words CW2 to CW4.

Here, it is assumed that an error (read error) has occurred in reading the content C1 by the SSD 24-1 and the error correction processing unit 2207 of the processor 22 executes the error correction processing on the content C1. Here, it is assumed that the number of error bits included in the data d1 of the content C1 exceeds the number of error bits correctable by the controller 241 of the SSD 24-1.

First, the processor 22 reads the components of the code word CW1 including the data d1. Specifically, the processor 22 transmits a read command for reading the data d11 to the SSD 24-2, transmits a read command for reading the data d21 to the SSD 24-3, and transmits a read command for reading the parity p1 to the SSD 24-4. As a result, the error correction processing unit 2207 of the processor 22 recalculates the correct data d1 by using the read data d11, data d21, and parity p1. In this manner, an error of data (here, the data d1) including many error bits in the content in which the read error has occurred is corrected. The error correction processing unit 2207 recovers the content C1 by the recalculated data d1 and the data d2 to d4 normally read from the SSD 24-1.

In this manner, it is possible to recover a content in which a read error has occurred, in a manner that an error included in the content in which the read error has occurred is corrected by using the code word CW including a plurality of pieces of data and parity, which are written in the SSDs 24-1 to 24-4 included in the cache server 2-1 in a distributed manner.

Figure 6:
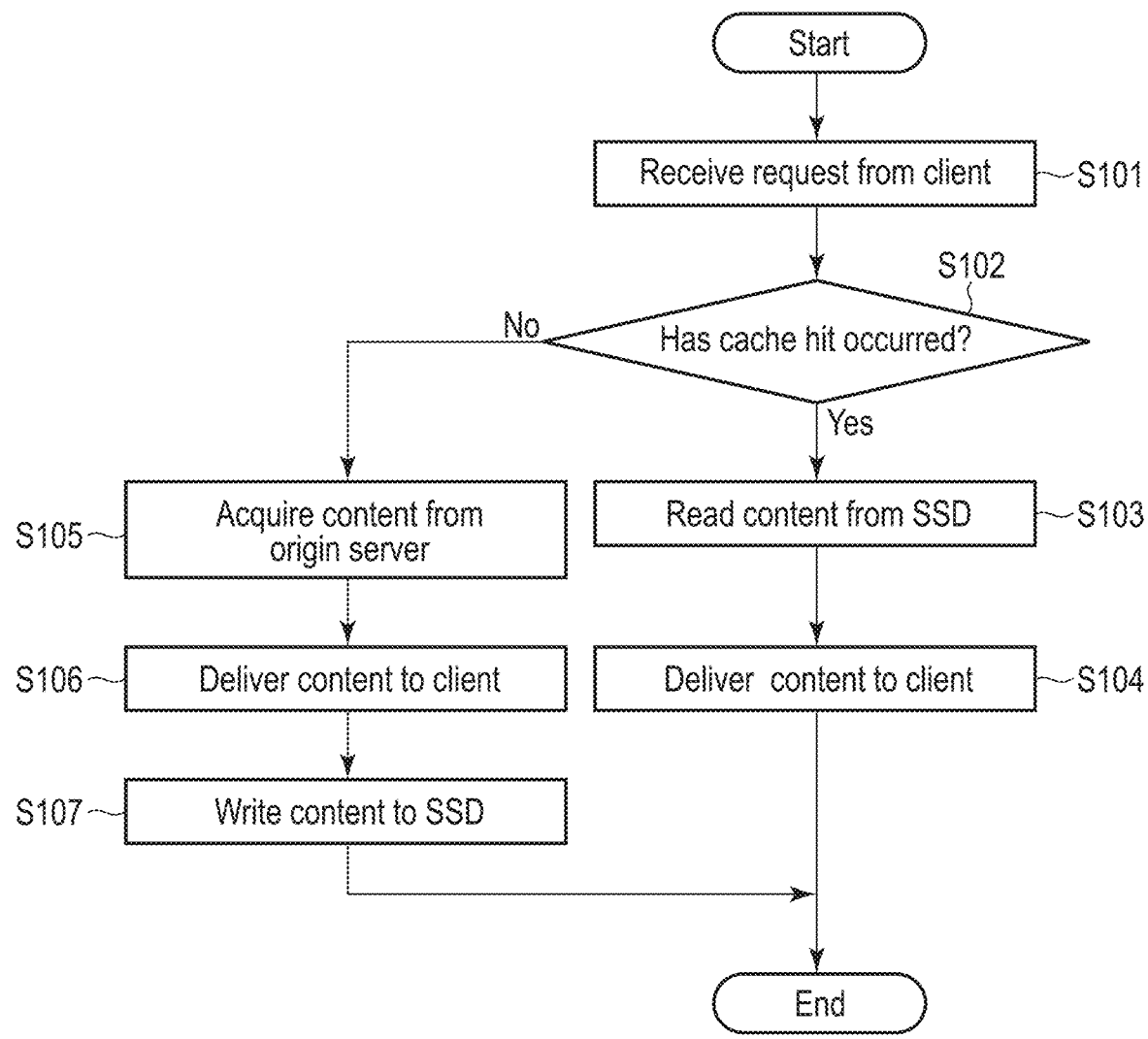
FIG. 6 is a flowchart illustrating a procedure of content delivery processing executed in the cache server according to the embodiment.

Next, content delivery processing executed in the cache server 2-1 will be described. FIG. 6 is a flowchart illustrating a procedure of the content delivery processing executed in the cache server 2-1 according to the embodiment.

First, the cache server 2-1 receives a request from a client (Step S101).

The cache server 2-1 determines whether or not cache hit has occurred (Step S102). In this case, the cache server 2-1 refers to the content management table 231 and determines whether or not the content designated by the request received in S101 is stored in any of the nonvolatile memories 242 of the SSDs 24-1 to 24-4 in the cache server 2-1.

In a case where the cache hit has occurred (Yes in S102), that is, in a case where the content designated by the request is stored in the nonvolatile memory 242 of any one of the SSDs 24-1 to 24-4, the cache server 2-1 reads the content from the SSD including the nonvolatile memory 242 in which the content is stored (Step S103).

The cache server 2-1 delivers the content read in S103 to the client (Step S104).

In a case where cache miss has occurred (No in S102), that is, in a case where the content designated by the request is not stored in the nonvolatile memory 242 of any one of the SSDs 24-1 to 24-4, the cache server 2-1 acquires the content designated by the request from the origin server 1 (Step S105).

The cache server 2-1 delivers the content acquired in S105 to the client (Step S106).

The cache server 2-1 writes the content acquired in S105 to the nonvolatile memory 242 included in the SSD as a writing destination, which is selected from the SSDs 24-1 to 24-4 (Step S107).

As described above, the cache server 2-1 delivers the requested content to the client in response to the request received from the client by executing the content delivery processing. At this time, in a case where the requested content is stored in the storage device (here, the SSDs 24-1 to 24-4) of the cache server 2-1, the cache server 2-1 delivers the content read from the storage device to the client. In addition, in a case where the requested content is not stored in the storage device of the cache server 2-1, the cache server 2-1 acquires the requested content from the origin server 1, delivers the acquired content to the client, and further writes the acquired content to the storage device.

Next, error detection processing will be described. FIG. 7 is a diagram for explaining error detection processing executed in the information delivery system including the cache server 2-1 according to the embodiment.

1. First, any one of the clients 4-1 to 4-4 transmits a request for requesting a content to the cache server 2-1. The processor 22 of the cache server 2-1 receives the request via the NIC 21.
2. The processor 22 transmits a read request for reading the content designated by the received request to, for example, the SSD 24-1.
3-4. The controller 241 of the SSD 24-1 that has received the read request reads the content from the nonvolatile memory 242.
5. The error correction circuit 2413 of the controller 241 executes the error correction processing by using the ECC added to the content read from the nonvolatile memory 242. In a case where the number of error bits included in the read content exceeds the number of error bits correctable by error correction circuit 2413, the error correction processing fails.
6. When the error correction processing fails, the error correction circuit 2413 notifies the processor 22 of a read error. By receiving the notification indicating the read error from the controller 241, the processor 22 detects that the read error has occurred in reading the content from the nonvolatile memory 242.

Figure 8:
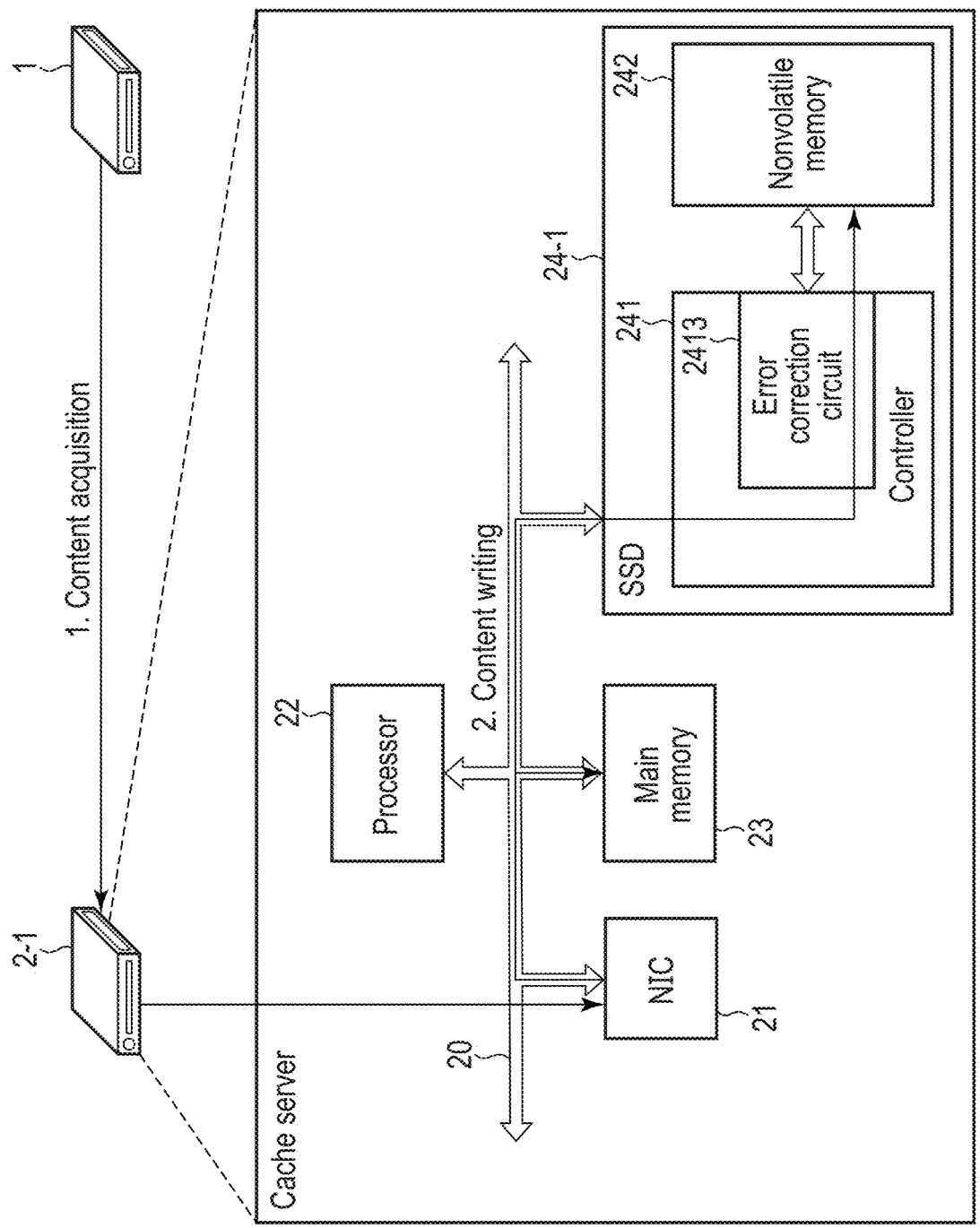
FIG. 8 is a diagram for explaining content recovery processing executed in the information delivery system including the cache server according to the embodiment.

Next, content recovery processing will be described. FIG. 8 is a diagram for explaining content recovery processing executed in the information delivery system including the cache server according to the embodiment. Here, it is assumed that a read error of a certain content has occurred in the SSD 24-1 and the content is recovered by acquiring the content from the origin server 1.

First, the cache server 2-1 acquires the content in which the read error has occurred from the origin server 1.

The acquired content is temporarily stored in the main memory 23.

The content stored in the main memory 23 is then written in the SSD 24-1. At this time, the processor 22 transmits to the SSD 24-1 a write command for requesting writing of the content.

Figure 9:
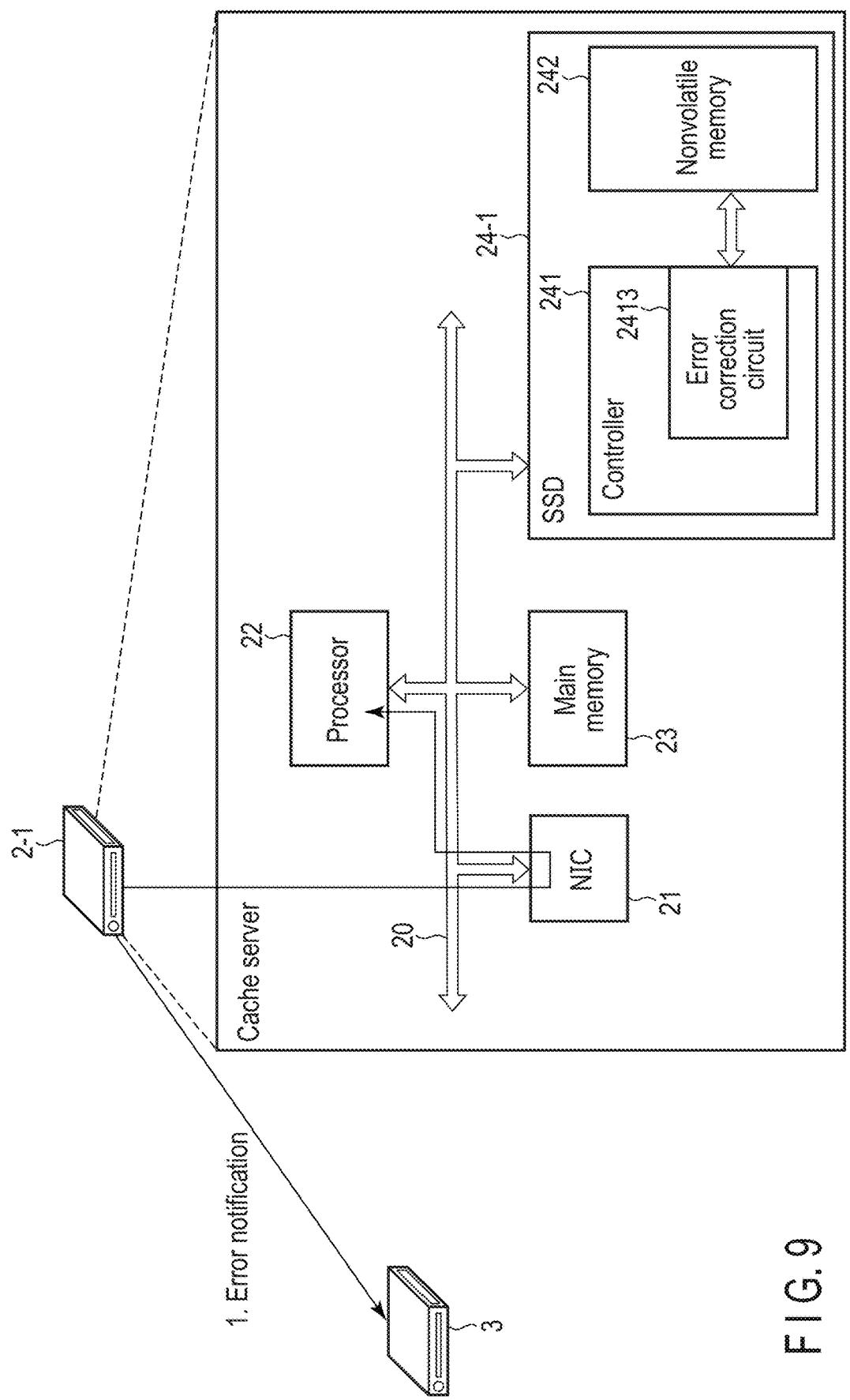
FIG. 9 is a diagram for explaining error notification processing executed in the information delivery system including the cache server according to the embodiment.

Next, error notification processing will be described. FIG. 9 is a diagram for explaining error notification processing executed in the information delivery system including the cache server 2-1 according to the embodiment. Here, it is assumed that a read error of a certain content has occurred in the SSD 24-1 in the cache server 2-1 is assumed.

1. In response to detection of the read error of a certain content by the read error detection unit 2205 of the processor 22, the processor 22 notifies the control server 3 of the error. The processor 22 notifies the control server 3 of the occurrence of the read error and the content in which the read error has occurred by the notification of the error.

Figure 10:
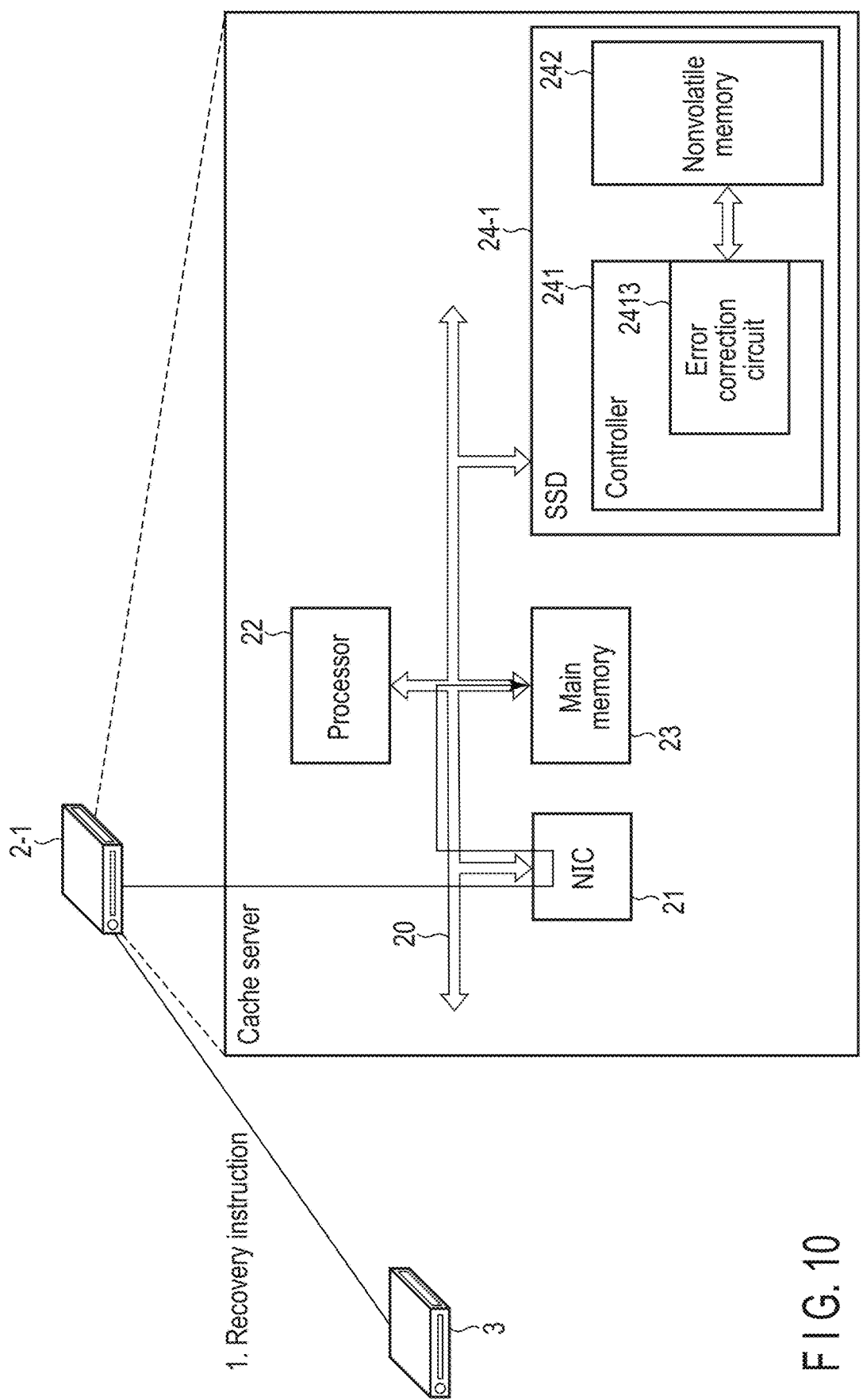
FIG. 10 is a diagram for explaining recovery instruction transmission processing executed in the information delivery system including the cache server according to the embodiment.

Next, recovery instruction transmission processing will be described. FIG. 10 is a diagram for explaining recovery instruction transmission processing executed in the information delivery system including the cache server 2-1 according to the embodiment.

1. The control server 3 transmits a recovery instruction to the cache server 2-1. The recovery instruction may include information for designating a predetermined content. The cache server 2-1 stores the received recovery instruction in the main memory 23. The cache server 2-1 can determine whether or not to recover the content in which the read error has occurred, based on the recovery instruction stored in the main memory 23.

Next, the delivery capability of the cache server 2-1 will be described. FIG. 11 is a diagram illustrating a first example of a delivery capability of the cache server 2-1 according to the embodiment.

Here, it is assumed that the SSDs 24-1 to 24-4 in the cache server 2-1 store the contents A, B, C, D, E, and F. FIG. 11 illustrates the predicted number of reads of each content and the delivery capability of the cache server 2-1. The predicted number of reads of each content may be either the predicted number of reads per unit time or the total predicted number of reads in the data retention request period (or the remaining data retention request period). In FIG. 11, it is assumed that the predicted number of reads per unit time is the predicted number of reads of each content. The predicted number of reads of a certain content per unit time is the number of times that the content is predicted to be requested from the client per unit time (for example, one second). In the following description, it is assumed that the delivery capability of the cache server 2-1 is calculated based on the predicted number reads of each content stored in the nonvolatile memory 242 of the SSDs 24-1 to 24-4. The delivery capability of the cache server 2-1 may be calculated based on not only the predicted number of reads of each content, but the predicted number of reads of each content and the remaining data retention request period of each content, or based on the predicted number of reads of each content, the size of each content, and the like.

The predicted number of reads of the content C1 is 30 times/second. The predicted number of reads of the content C2 is 50 times/second. The predicted number of reads of the content C3 is 20 times/second. The predicted number of reads of the content C4 is 30 times/second. The predicted number of reads of the content C5 is 45 times/second. The predicted number of reads of the content C6 is 25 times/second.

At this time, the delivery capability of the cache server 2-1 is A1. The delivery capability A1 is calculated, for example, based on the total number of the predicted numbers of times of reading of the contents C1 to C6.

Here, it is assumed that an error has occurred in reading the content C4 from the nonvolatile memory 242. FIG. 12 is a diagram illustrating a second example of the delivery capability of the cache server 2-1 according to the embodiment.

Since an error has occurred in the reading the content C4, the content C4 becomes a content that cannot be delivered from the cache server 2-1. Therefore, when calculating the delivery capability of the cache server 2-1, the delivery capability calculation unit 2208 of the processor 22 calculates the delivery capability based on the information of the contents C1 to C3 and the contents C5 and C6 excluding the content C4. Here, the calculated delivery capability of the cache server 2-1 is A2, and A2 is a value less than A1. That is, since the content C4 becomes an undeliverable content, the delivery capability of the cache server 2-1 decreases.

Since the predicted number of reads of each content has an influence on the delivery capability of the cache server 2-1, in a case where a read error of not the content C4 but a content (for example, content C2) having a more predicted number of reads than the content C4 has occurred, the delivery capability of the cache server 2-1 is reduced to a value less than A2. Conversely, in a case where a read error of not the content C4 but a content (for example, content C3) having a less predicted number of reads than the content C4 has occurred, the delivery capability of the cache server 2-1 has a value more than A2. However, this delivery capability has a value less than A1.

Figure 13:
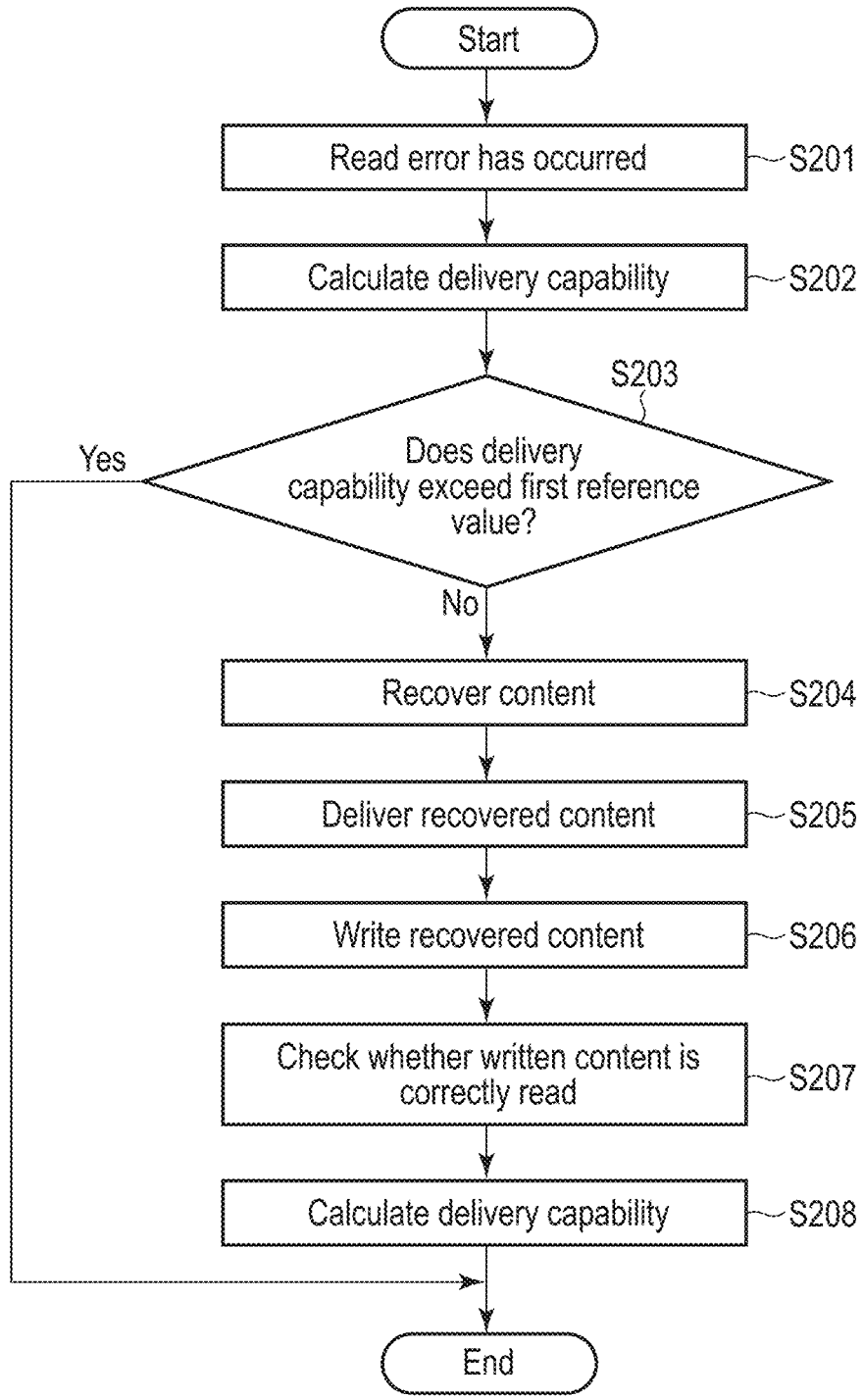
FIG. 13 is a flowchart illustrating a procedure of a first example of the content recovery processing executed in the cache server according to the embodiment.

Next, a first example of the content recovery processing will be described. FIG. 13 is a flowchart illustrating a procedure of the first example of the content recovery processing executed in the cache server 2-1 according to the embodiment. A case where the cache server 2-1 includes only the SSD 24-1 as a storage device will be mainly described below.

In a case where a content (referred to as a delivery target content below) designated by a request from any client 4 among the clients 4-1 to 4-4 is stored in the nonvolatile memory 242 of the SDD 24-1, the processor 22 of the cache server 2-1 transmits a read command for reading the delivery target content to the SDD 24-1, thereby executing read processing of reading the delivery target content from the nonvolatile memory 242. When an error (read error) occurs in reading the delivery target content from the nonvolatile memory 242, the controller 241 notifies the processor 22 of the read error.

In response to reception of the notification of the read error from the controller 241, the processor 22 detects that a read error of the delivery target content has occurred (Step S201).

The processor 22 calculates the delivery capability of the cache server 2-1 in consideration of the read error detected in S201 (Step S202). That is, the processor 22 calculates the delivery capability of the cache server 2-1 by handling the delivery target content that cannot be read from the nonvolatile memory 242 due to the occurrence of the read error, as a content that cannot be delivered.

The processor 22 determines whether or not the delivery capability of the cache server 2-1 calculated in S202 exceeds the first reference value (Step S203).

In a case where the delivery capability of the cache server 2-1 exceeds the first reference value (Yes in S203), the processor 22 ends the content recovery processing without recovering the delivery target content.

In a case where the delivery capability of the cache server 2-1 does not exceed the first reference value (No in S203), the processor 22 recovers the delivery target content that could not be read from the nonvolatile memory 242 due to the occurrence of the read error (Step S204). In this case, the processor 22 may recover the delivery target content in which the read error has occurred, by acquiring the delivery target content from the origin server 1 or another cache server 2 (the cache server 2-2 or the cache server 2-3) via the network 5. Alternatively, in a case where the cache server 2-1 includes a plurality of SSDs (SSDs 24-1 to 24-4), the processor 22 may execute error correction processing (for example, the error correction processing described with reference to FIG. 5) different from the error correction processing executed in the controller 241, by using data read from the SSDs 24-1 to 24-4 included in the cache server 2-1, thereby recovering the delivery target content in which the read error has occurred.

The processor 22 delivers the delivery target content recovered in S204 to the client 4 that has requested the delivery target content via the network 5 (Step S205).

The processor 22 writes the delivery target content recovered in S204 to the nonvolatile memory 242 of the SSD 24-1 (Step S206).

The processor 22 checks whether or not the delivery target content written in S206 can be correctly read from the nonvolatile memory 242 (Step S207). That is, the processor 22 determines (checks) whether or not the delivery target content is normally readable from the nonvolatile memory 242, by executing processing of reading the delivery target content from the nonvolatile memory 242.

In a case where it is checked in S207 that the delivery target content can be correctly read, the processor 22 handles the recovered delivery target content as a deliverable content and calculates the delivery capability of the cache server 2-1 again (Step S208). In this case, the delivery capability calculated in S208 is the delivery capability of the cache server 2-1 after the recovery of the delivery target content. On the other hand, in a case where it has not been checked in S207 that the delivery target content can be correctly read, that is, in a case where it has been determined that the delivery target content cannot be correctly read, the processor 22 may execute the process of S206 again and write the delivery target content to the nonvolatile memory 242 again. After the delivery target content is written again in the nonvolatile memory 242, the processor 22 may execute the determination processes of S207 again. In a case where it is determined that the delivery target content written again in the nonvolatile memory 242 is normally readable from the nonvolatile memory 242, the processor 22 handles the recovered delivery target content as the deliverable content and calculates the delivery capability of the cache server 2-1 again (Step S208). Alternatively, in a case where it has not been checked in S207 that the delivery target content can be correctly read, the processor 22 may use the delivery capability calculated in S202 as the delivery capability of the cache server 2-1 instead of writing the delivery target content in the nonvolatile memory 242 again.

As described above, when a read error has occurred in reading a certain delivery target content from the nonvolatile memory 242, the cache server 2-1 handles the delivery target content as an undeliverable content and calculates the delivery capability of the cache server 2-1. The cache server 2-1 determines whether or not to recover the delivery target content in which the read error has occurred, based on the calculated delivery capability of the cache server 2-1. That is, when the delivery target content cannot be delivered due to a read error of a certain delivery target content, the delivery capability of the cache server 2-1 decreases. If the decreased delivery capability of the cache server 2-1 satisfies a predetermined reference value, the processor 22 does not recover the delivery target content in which the read error has occurred. As a result, it is possible to suppress the wear-out of the nonvolatile memory 242 as compared with a case where all delivery target contents in which a read error has occurred are unconditionally recovered and all the recovered delivery target content are written in the nonvolatile memory 242. As a result, it is possible to effectively use the physical resources of the nonvolatile memory 242 to write a new delivery target content designated by a new request. Furthermore, regarding the delivery target content in which the read error has occurred, there is a high probability that a certain period has already elapsed after the delivery target content has been written in the nonvolatile memory 242. In such a case, even when the delivery target content in which the read error has occurred is recovered and the recovered delivery target content is written in the nonvolatile memory 242, the data retention request period of the recovered delivery target content may immediately expire. In this case, since the recovered delivery target content is not delivered to any client, the physical resources of the nonvolatile memory 242 are wastefully consumed. Regarding a new content designated by a new request, since the new content is not stored in the nonvolatile memory 242, the new content is acquired from the origin server 1. The new content is continuously retained in the nonvolatile memory 242 only during the data retention request period of the new content. Thus, in writing the new content in the nonvolatile memory 242, it is possible to relatively efficiently use the physical resources of the nonvolatile memory 242 as compared with a case where the delivery target content in which the read error has occurred is recovered and written in the nonvolatile memory 242.

In addition, in a case where the delivery capability of the cache server 2-1 calculated in Step S202 is equal to or less than the first reference value, the delivery target content in which the read error has occurred is recovered and written in the nonvolatile memory 242, whereby the delivery capability of the cache server 2-1 can be recovered to the delivery capability immediately before the read error has occurred.

Figure 14:
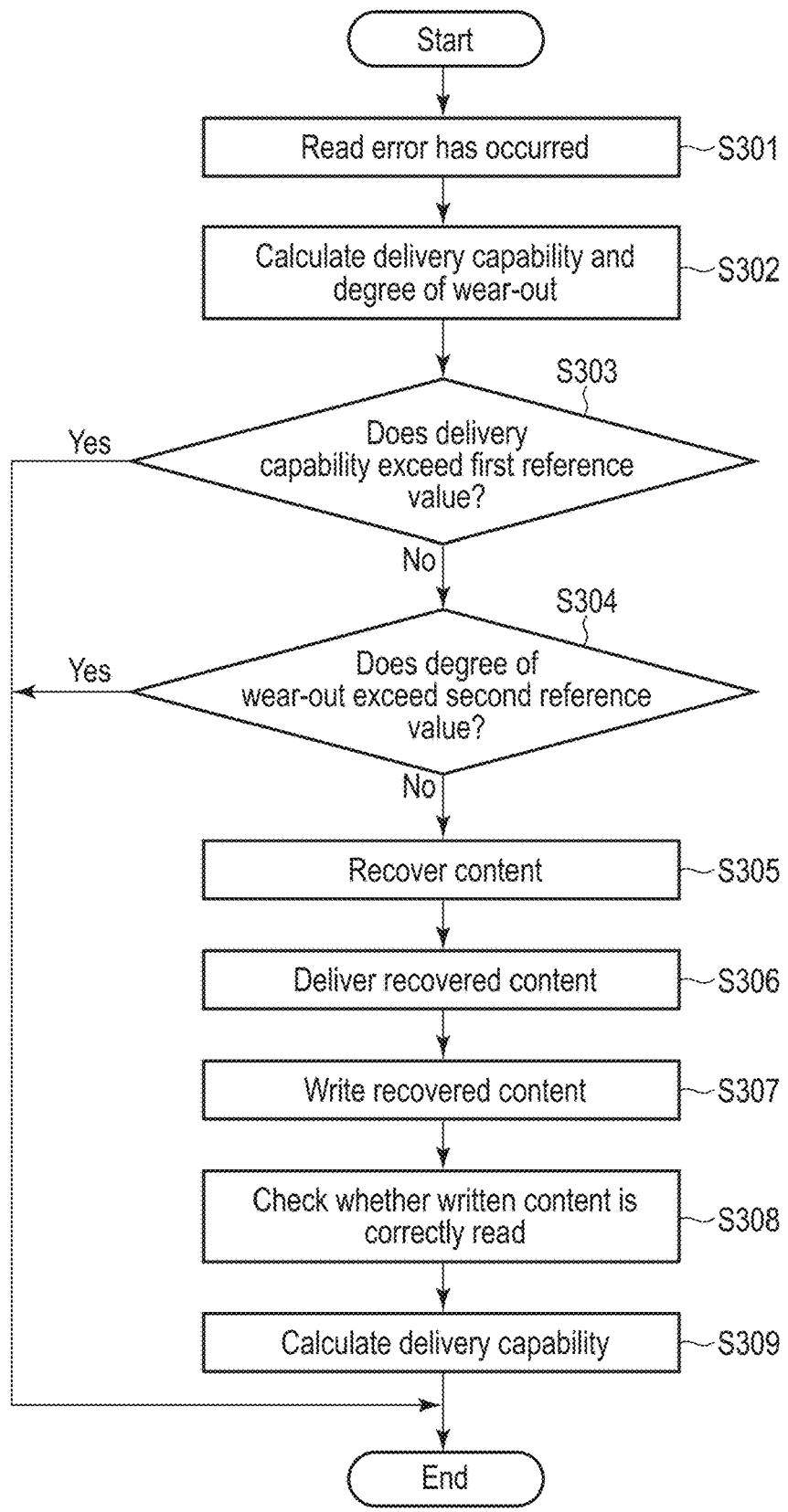
FIG. 14 is a flowchart illustrating a procedure of a second example of the content recovery processing executed in the cache server according to the embodiment.

Next, a second example of the content recovery processing will be described. FIG. 14 is a flowchart illustrating a procedure of the second example of the content recovery processing executed in the cache server 2-1 according to the embodiment.

In response to reception of the notification of the read error from the controller 241, the processor 22 detects that the read error of the delivery target content designated by the request from the client 4 has occurred (Step S301).

The processor 22 calculates the delivery capability of the cache server 2-1 and the degree of wear-out of the nonvolatile memory 242 of the cache server 2-1 in consideration of the read error detected in S301 (Step S302). In this case, the processor 22 calculates the delivery capability of the cache server 2-1 by handling the delivery target content that cannot be read from the nonvolatile memory 242 due to the occurrence of the read error, as an undeliverable content. In addition, the processor 22 may calculate the degree of wear-out of the nonvolatile memory 242, for example, based on at least one of (1) the P/E cycle count (the number of rewrites) of the nonvolatile memory 242, (2) the ratio of the P/E cycle count of the nonvolatile memory 242 to the total number of P/E cycle counts allowed in the nonvolatile memory 242, (3) the total amount of data written in the nonvolatile memory 242, (4) the ratio of the total amount of data written in the nonvolatile memory 242 to the total amount of data writable in the nonvolatile memory 242, and (5) a ratio of a bit error rate (BER) of the SSD 24-1 to a bit error rate (BER) allowed in the SSD 24-1. Information indicating (1), information indicating (2), information indicating (3), information indicating (4), and information indicating (5) are managed by the controller 241 of the SSD 24-1. Thus, the processor 22 can acquire any information among the pieces of information (1) to (5) from the SSD 24-1 as necessary.

The processor 22 determines whether or not the delivery capability of the cache server 2-1 calculated in S302 exceeds the first reference value (Step S303).

In a case where the delivery capability of the cache server 2-1 exceeds the first reference value (Yes in S303), the processor 22 ends the content recovery processing without recovering the delivery target content.

In a case where the delivery capability of the cache server 2-1 does not exceed the first reference value (No in S303), the processor 22 determines whether or not the degree of wear-out of the nonvolatile memory 242 calculated in S302 exceeds the second reference value (Step S304).

In a case where the degree of wear-out of the nonvolatile memory 242 exceeds the second reference value (Yes in S304), the processor 22 ends the content recovery processing without recovering the delivery target content.

In a case where the degree of wear-out of the nonvolatile memory 242 does not exceed the second reference value (No in S304), the processor 22 recovers the delivery target content that could not be read from the SSD 24-1 due to the occurrence of the read error (Step S305). In this case, the processor 22 may recover the delivery target content in which the read error has occurred, by acquiring the delivery target content from the origin server 1 or another cache server 2 (the cache server 2-2 or the cache server 2-3) via the network 5. Alternatively, in a case where the cache server 2-1 includes a plurality of SSDs (SSDs 24-1 to 24-4), the processor 22 may execute error correction processing (for example, the error correction processing described with reference to FIG. 5) different from the error correction processing executed in the controller 241, by using data read from the SSDs 24-1 to 24-4 included in the cache server 2-1, thereby recovering the delivery target content in which the read error has occurred.

The processor 22 delivers the delivery target content recovered in S305 to the client 4 that has requested the delivery target content via the network 5 (Step S306).

The processor 22 writes the delivery target content recovered in S305 to the nonvolatile memory 242 of the SSD 24-1 (Step S307).

The processor 22 checks whether or not the delivery target content written in S206 can be correctly read from the nonvolatile memory 242 (Step S308). That is, the processor 22 determines (checks) whether or not the delivery target content is normally readable from the nonvolatile memory 242, by executing processing of reading the delivery target content from the nonvolatile memory 242.

In a case where it is checked in S308 that the delivery target content can be correctly read, the processor 22 handles the recovered delivery target content as a deliverable content and calculates the delivery capability of the cache server 2-1 again (Step S309). In this case, the delivery capability calculated in S309 is the delivery capability of the cache server 2-1 after the recovery of the delivery target content. On the other hand, in a case where it has not been checked in S308 that the delivery target content can be correctly read, that is, in a case where it has been determined that the delivery target content cannot be correctly read, the processor 22 may execute the process of S307 again and write the delivery target content to the nonvolatile memory 242 again. After the delivery target content is written again in the nonvolatile memory 242, the processor 22 may execute the determination processes of S308 again. In a case where it is determined that the delivery target content written again in the nonvolatile memory 242 is normally readable from the nonvolatile memory 242, the processor 22 handles the recovered delivery target content as the deliverable content and calculates the delivery capability of the cache server 2-1 again (Step S309). Alternatively, in a case where it has not been checked in S308 that the delivery target content can be correctly read, the processor 22 may use the delivery capability calculated in S302 as the delivery capability of the cache server 2-1 instead of writing the delivery target content in the nonvolatile memory 242 again.

As a result, when a read error has occurred in reading the content from the nonvolatile memory 242, the cache server 2-1 can determine whether or not to recover the content, based on not only the delivery capability of the cache server 2-1, but the delivery capability of the cache server 2-1 and the degree of wear-out of the nonvolatile memory 242 in the cache server 2-1. That is, in a case where the nonvolatile memory 242 in the cache server 2-1 has been exhausted, the processor 22 skips content recovery. As a result, the cache server 2-1 can prevent further progress of the wear-out of the nonvolatile memory 242 of the cache server 2-1.

Next, a third example of the content recovery processing will be described. FIG. 15 is a flowchart illustrating a procedure of the third example of the content recovery processing executed in the cache server 2-1 according to the embodiment.

In response to reception of the notification of the read error from the controller 241, the processor 22 detects that the read error of the delivery target content designated by the request from the client 4 has occurred (Step S401).

The processor 22 calculates the delivery capability of the cache server 2-1 in consideration of the read error detected in S401 (Step S402). The processor 22 calculates the delivery capability of the cache server 2-1 by handling the delivery target content that cannot be read from the SSD 24-1 due to the occurrence of the read error, as an undeliverable content.

The processor 22 shares the delivery capability with the other cache servers 2-2 and 2-3 (Step S403). In Step S403, the processor 22 executes processing of transmitting the delivery capability of the cache server 2-1 calculated in S402 to each of the other cache servers 2-2 and 2-3. Further, the processor 22 also executes processing of receiving the delivery capability of each of the other cache servers 2-2 and 2-3 from each of the other cache servers 2-2 and 2-3.

The processor 22 calculates the delivery capability of the entirety of the plurality of cache servers including the cache servers 2-1 to 2-3 based on the delivery capability of the cache server 2-1 and the delivery capability of each of the other cache servers 2-2 and 2-3, and determines whether or not the delivery capability of the entirety of the plurality of cache servers exceeds the third reference value (Step S404). For example, the processor 22 may calculate the sum of the delivery capability of the cache server 2-1, the delivery capability of the cache server 2-2, and the delivery capability of the cache server 2-3 as the delivery capability of the entirety of the plurality of cache servers. The third reference value is a threshold value used to evaluate the delivery capability of the entirety of the plurality of cache servers including the cache servers 2-1 to 2-3 instead of the delivery capability of the cache server 2-1 alone. The third reference value may be determined based on the target value of the delivery capability required for the entirety of the plurality of cache servers to improve the content delivery speed in the information delivery system. For example, in a case where the calculated delivery capability of the entirety of the plurality of cache servers indicates the sum of the total number of contents expected to be delivered to any client 4 per unit time by the cache server 2-1, the total number of contents expected to be delivered to any client 4 per unit time by the cache server 2-2, and the total number of contents expected to be delivered to any client 4 per unit time by the cache server 2-3, the third reference value may be determined based on a target value of the total number of contents delivered per unit time, which is obtained for the entirety of the plurality of cache servers.

In a case where the delivery capability of the entirety of the plurality of cache servers including the cache servers 2-1 to 2-3 does not exceed the third reference value (No in S404), the processor 22 recovers the delivery target content that could not be read from the nonvolatile memory 242 due to the occurrence of the read error (Step S405). In this case, the processor 22 may recover the delivery target content in which the read error has occurred, by acquiring the delivery target content from the origin server 1 or another cache server 2 (the cache server 2-2 or the cache server 2-3) via the network 5. Alternatively, in a case where the cache server 2-1 includes a plurality of SSDs (SSDs 24-1 to 24-4), the processor 22 may execute error correction processing (for example, the processing described with reference to FIG. 5) different from the error correction processing executed in the controller 241, by using data read from the SSDs 24-1 to 24-4 included in the cache server 2-1, thereby recovering the delivery target content in which the read error has occurred.

The processor 22 delivers the delivery target content recovered in S405 to the client 4 that has requested the delivery target content via the network 5 (Step S406).

The processor 22 writes the delivery target content recovered in S405 to the nonvolatile memory 242 of the SSD 24-1 (Step S407).

The processor 22 checks whether or not the delivery target content written in S407 can be correctly read from the nonvolatile memory 242 (Step S408). That is, the processor 22 determines (checks) whether or not the delivery target content is normally readable from the nonvolatile memory 242, by executing processing of reading the delivery target content from the nonvolatile memory 242.

In a case where the written delivery target content can be correctly read, that is, in a case where the delivery target content recovered in S405 is normally readable from the nonvolatile memory 242 (Yes in S408), the processor 22 handles the recovered delivery target content as the deliverable content and calculates the delivery capability of the cache server 2-1 again (Step S409).

The processor 22 transmits the delivery capability of the cache server 2-1 calculated in S409 to each of the other cache servers 2-2 and 2-3, and shares the delivery capability of the cache server 2-1 calculated in S409 with the other cache servers 2-2 and 2-3 (Step S410).

In a case where the delivery capability of the entirety of the plurality of cache servers including the cache servers 2-1 to 2-3 exceeds the third reference value (Yes in S404), or in a case where the delivery target content written in S407 cannot be correctly read from the nonvolatile memory 242 (No in S408), the processor 22 notifies each of the other cache servers 2-2 and 2-3 that the delivery target content has been lost from the cache server 2-1 (Step S411).

Then, the processor 22 ends the content recovery processing.

As a result, when a read error has occurred in reading the delivery target content from the nonvolatile memory 242, the cache server 2-1 can determine whether or not to recover the delivery target content in which the read error has occurred in consideration of not only the delivery capability of the cache server 2-1 but also the delivery capability of each of the other cache servers 2-2 and 2-3. That is, even in a case where the delivery target content that cannot be read due to the read error has occurred, if the delivery capability of the entirety of the plurality of cache servers satisfies the reference value, the entire information delivery system can provide the content delivery service with sufficient performance, so that the processor 22 skips the recovery of the delivery target content in which the read error has occurred. As a result, the cache server 2-1 can suppress the wear-out of the nonvolatile memory 242 of the cache server 2-1.

The process of S304 described with reference to FIG. 14 can also be applied to the content recovery processing of FIG. 15. In this case, when a read error has occurred in reading the content from the nonvolatile memory 242, the cache server 2-1 determines whether or not to recover the content, based on the delivery capability of the entirety of the plurality of cache servers and the degree of wear-out of the nonvolatile memory 242 in the cache server 2-1. That is, in a case where the wear-out of the nonvolatile memory 242 in the cache server 2-1 has progressed, the processor 22 skips the recovery of the content in which the read error has occurred, even when the delivery capability of the entirety of the plurality of cache servers does not exceed the reference value. As a result, the cache server 2-1 can prevent further progress of the wear-out of the nonvolatile memory 242 of the cache server 2-1.

Next, a fourth example of the content recovery processing will be described. FIG. 16 is a flowchart illustrating a procedure of the fourth example of the content recovery processing executed in the cache server 2-1 according to the embodiment. In the fourth example, the cache server 2-1 periodically acquires the delivery capability of the entirety of the plurality of cache servers from the control server 3, and retains the acquired delivery capability in the main memory 23. That is, each of the cache servers 2-1 to 2-3 can transmit the own delivery capability to the control server 3 instead of transmitting the own delivery capability to each of the other cache servers. In this case, the control server 3 calculates the delivery capability of the entirety of the plurality of cache servers including the cache servers 2-1 to 2-3 based on the delivery capability received from each of the cache servers 2-1 to 2-3, and transmits the calculated delivery capability of the entirety of the plurality of cache servers to each of the cache servers 2-1 to 2-3. As a result, the cache server 2-1 can periodically acquire the delivery capability of the entirety of the plurality of cache servers from the control server 3.

In response to reception of the notification of the read error from the controller 241, the processor 22 detects that the read error of the delivery target content designated by the request from the client 4 has occurred (Step S501).

The processor 22 determines whether or not the delivery capability of the entirety of the plurality of cache servers, which has been retained in the main memory 23, that is, the delivery capability of the entirety of the plurality of cache servers, which has been received in advance from the control server 3 exceeds the third reference value (Step S502).

In a case where the delivery capability of the entirety of the plurality of cache servers, which has been received in advance from the control server 3 does not exceed the third reference value (No in S502), the processor 22 recovers the delivery target content that could not be read from the nonvolatile memory 242 due to the occurrence of the read error (Step S503). In this case, the processor 22 may recover the delivery target content in which the read error has occurred, by acquiring the delivery target content from the origin server 1 or another cache server 2 (the cache server 2-2 or the cache server 2-3) via the network 5. Alternatively, in a case where the cache server 2-1 includes a plurality of SSDs (SSDs 24-1 to 24-4), the processor 22 may execute error correction processing (for example, the error correction processing described with reference to FIG. 5) different from the error correction processing executed in the controller 241, by using data read from the SSDs 24-1 to 24-4 included in the cache server 2-1, thereby recovering the delivery target content in which the read error has occurred.

The processor 22 delivers the delivery target content recovered in S503 to the client 4 that has requested the delivery target content via the network 5 (Step S504).

The processor 22 writes the delivery target content recovered in S503 to the nonvolatile memory 242 of the SSD 24-1 (Step S505).

The processor 22 checks whether or not the delivery target content written in S505 can be correctly read from the nonvolatile memory 242 (Step S506).

In a case where the written delivery target content can be correctly read (Yes in S506), the processor 22 handles the delivery target content as the deliverable content and calculates the delivery capability of the cache server 2-1 (Step S509).

The processor 22 determines whether or not the delivery capability of the cache server 2-1 calculated in S509 has changed from the delivery capability of the cache server 2-1 previously notified to the control server 3 (Step S510).

In a case where the delivery capability of the cache server 2-1 calculated in S509 is changed from the delivery capability of the cache server 2-1 previously notified to the control server 3 (Yes in S510), the processor 22 notifies the control server 3 of the delivery capability of the cache server 2-1 calculated in S509 (Step S511), and then, ends the content recovery processing.

In a case where the delivery capability of the cache server 2-1 calculated in S509 is not changed from the delivery capability of the cache server 2-1 previously notified to the control server 3 (No in S510), the processor 22 ends the content recovery processing without notifying the control server 3 of the delivery capability of the cache server 2-1 calculated in S509.

In a case where the delivery capability of the entirety of the plurality of cache servers exceeds the third reference value (Yes in S502) or in a case where the delivery target content written in S505 could not be correctly read from the nonvolatile memory 242 (No in S506), the processor 22 handles the delivery target content as the undeliverable content and calculates the delivery capability of the cache server 2-1 (Step S507).

The processor 22 notifies the control server 3 that the delivery target content has been lost from the cache server 2-1 (Step S508). The processor 22 can notify the control server 3 of the delivery capability of the cache server 2-1 calculated in S507 together with the loss of the delivery target content.

As described above, in a case where the delivery capability of the entirety of the plurality of cache servers can be received from the control server 3, the cache server 2-1 can determine whether or not to perform recovery of the delivery target content that could not be read from the nonvolatile memory 242 due to the occurrence of the read error, based on the delivery capability of the entirety of the plurality of cache servers received from the control server 3.

The process of S304 described with reference to FIG. 14 can also be applied to the content recovery processing of FIG. 16. In this case, when a read error has occurred in reading the content from the nonvolatile memory 242, the cache server 2-1 determines whether or not to recover the content, based on the delivery capability of the entirety of the plurality of cache servers, which has been received in advance from the control server 3, and the degree of wear-out of the nonvolatile memory 242 in the cache server 2-1. That is, in a case where the wear-out of the nonvolatile memory 242 in the cache server 2-1 has progressed, the processor 22 skips the recovery of the content in which the read error has occurred, even when the delivery capability of the entirety of the plurality of cache servers does not exceed the reference value. As a result, the cache server 2-1 can prevent further progress of the wear-out of the nonvolatile memory 242 of the cache server 2-1.

Next, a fifth example of the content recovery processing will be described. FIG. 17 is a flowchart illustrating a procedure of the fifth example of the content recovery processing executed in the cache server 2-1 according to the embodiment. A request for designating a content Cn is transmitted from the clients 4-1 to 4-4 to the cache server 2-1. A read error has occurred in the SSD 24-1, and the content recovery processing is started in response to a notification of the read error from the controller 241 to the processor 22. In the fifth example, the cache server 2-1 acquires a recovery instruction for designating a specific content from the control server 3 in advance, and retains the acquired recovery instruction in the main memory 23. Furthermore, in the fifth example, as in the fourth example, as an example, it is assumed that each of the cache servers 2-1 to 2-3 executes processing of notifying the control server 3 of the own delivery capability.

The processor 22 detects the occurrence of a read error for the content Cn (Step S601).

The processor 22 determines whether or not a recovery instruction for designating the content Cn is retained in the main memory 23, that is, whether or not a recovery instruction of the content Cn has been received in advance from the control server 3 (Step S602). This recovery instruction is a recovery instruction indicating that a predetermined content is to be recovered, and is also referred to as a second recovery instruction.

In a case where the recovery instruction for designating the content Cn is retained in the main memory 23 (Yes in S602), the processor 22 recovers the content Cn (Step S603). The cache server 2-1 may acquire the content Cn from the origin server 1 or the other cache servers 2-2 and 3, or may recover the content Cn by error correction processing by the processor 22.

The processor 22 delivers the content Cn recovered in S603 to the client that has requested the content Cn (Step S604).

The processor 22 writes the content Cn recovered in S603 to the nonvolatile memory 242 of the SSD 24-1 (Step S605).

The processor 22 checks whether or not the content Cn written in S605 can be correctly read from the nonvolatile memory 242 (Step S606).

In a case where the content Cn can be correctly read (Yes in S606), the processor 22 handles the content Cn as the deliverable content and calculates the delivery capability of the cache server 2-1 (Step S609).

The processor 22 determines whether or not the delivery capability of the cache server 2-1 calculated in S609 has changed from the delivery capability of the cache server 2-1 previously notified to the control server 3 (Step S610).

In a case where the delivery capability of the cache server 2-1 calculated in S609 is changed from the delivery capability of the cache server 2-1 previously notified to the control server 3 (Yes in S610), the processor 22 notifies the control server 3 of the delivery capability of the cache server 2-1 calculated in S609 (Step S611), and then, ends the content recovery processing.

In a case where the delivery capability of the cache server 2-1 calculated in S609 is not changed from the delivery capability of the cache server 2-1 previously notified to the control server 3 (No in S610), the processor 22 ends the content recovery processing without notifying the control server 3 of the delivery capability of the cache server 2-1 calculated in S609.

In a case where the recovery instruction for designating the content Cn is not retained (No in S602), or in a case where the content Cn written in S605 cannot be correctly read (No in S606), the processor 22 handles the content Cn as the undeliverable content and calculates the delivery capability of the cache server 2-1 (Step S607).

The processor 22 notifies the control server 3 that the content Cn has been lost from the cache server 2-1 (Step S608). In addition, the processor 22 can notify the control server 3 of the delivery capability calculated in S607 together with the fact that the content Cn has been lost from the cache server 2-1.

As a result, in a case where a read error of the content for which a recovery instruction has been received in advance from the control server 3 has occurred, the cache server 2-1 can immediately start recovery of the content in which the read error has occurred.

Figure 18:
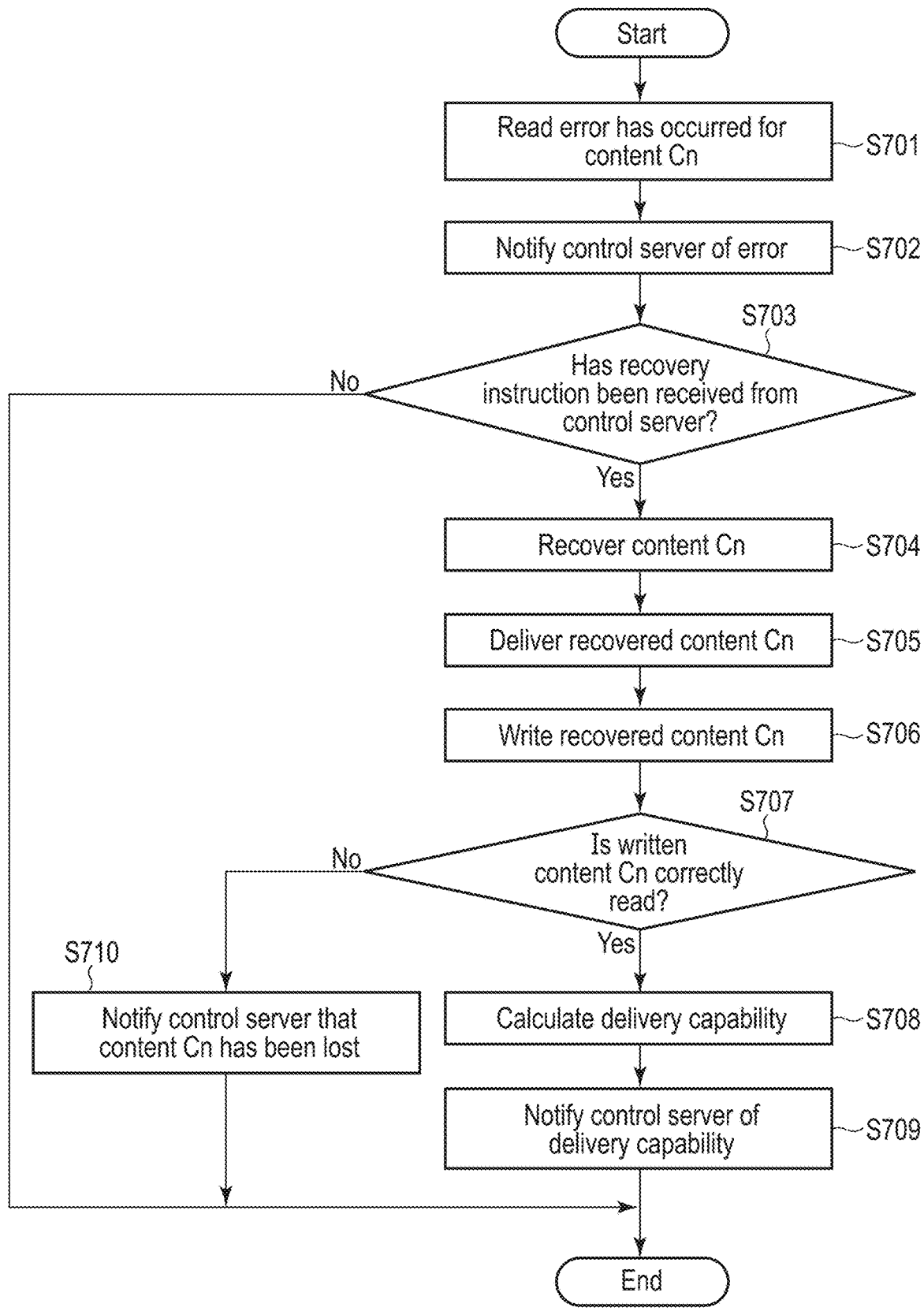
FIG. 18 is a flowchart illustrating a procedure of a sixth example of the content recovery processing executed in the cache server according to the embodiment.

Next, a sixth example of the content recovery processing will be described. FIG. 18 is a flowchart illustrating a procedure of the sixth example of the content recovery processing executed in the cache server 2-1 according to the embodiment. A request of the content Cn is transmitted from the clients 4-1 to 4-4 to the cache server 2-1. A read error has occurred in the SSD 24-1, and the content recovery processing is started in response to a notification of the read error from the controller 241 to the processor 22.

The processor 22 detects the occurrence of a read error for the content Cn (Step S701).

The processor 22 notifies the control server 3 that the read error has occurred for the content Cn (Step S702).

The processor 22 determines whether or not a recovery instruction indicating that the content Cn is recovered has been received from the control server 3 (Step S703). This recovery instruction is a first recovery instruction indicating that the delivery target content (here, the content Cn) in which the read error has occurred is to be recovered.

In a case where the recovery instruction indicating that the content Cn is recovered is not received (No in S703), the processor 22 ends the content recovery processing.

In a case where the recovery instruction indicating that the content Cn is recovered has been received (Yes in S703), the processor 22 recovers the content Cn (Step S704). The cache server 2-1 may acquire the content Cn from the origin server 1 or the other cache servers 2-2 and 3, or may recover the content Cn by error correction processing by the processor 22.

The processor 22 delivers the content Cn recovered in S704 to the client that has requested the content Cn (Step S705).

The processor 22 writes the content Cn recovered in S704 to the nonvolatile memory 242 of the SSD 24-1 (Step S706).

The processor 22 checks whether or not the content Cn written in S706 can be correctly read from the nonvolatile memory 242 (Step S707).

In a case where the content Cn can be correctly read (Yes in S707), the processor 22 handles the content Cn as the deliverable content and calculates the delivery capability (Step S708).

The processor 22 notifies the control server 3 of the delivery capability calculated in S708 (Step S709).

In a case where the content Cn cannot be correctly read, the processor 22 notifies the control server 3 that the content Cn has been lost from the cache server 2-1 (Step S710).

As a result, the cache server 2-1 can determine whether or not the content recovery processing is executed, based on the recovery instruction received from the control server 3 every time a read error occurs.

The process of S702 and the processes of S703 to S710 in the content recovery processing of FIG. 18 may be applied to each of the content recovery processing described with reference to FIGS. 13, 14, and 15, for example.

For example, in the content recovery processing of FIG. 13, the process of S702 of FIG. 18 may be executed after S201 of FIG. 13. As a result, the control server 3 is notified of the occurrence of a read error of the delivery target content. In a case where it is determined that the delivery capability of the cache server 2-1 calculated in S202 of FIG. 13 exceeds the first reference value (Yes in S203 in FIG. 13), the processes of S703 to S710 in the content recovery processing of FIG. 18 may be executed. As a result, the processor 22 determines whether or not a recovery instruction (first recovery instruction) indicating that the content Cn in which the read error has occurred is to be recovered has been received from the control server 3 after determining that the delivery capability of the cache server 2-1 calculated in S202 exceeds the first reference value, that is, after determining that the content Cn is not recovered. In a case where the first recovery instruction is received from the control server 3, the processor 22 executes the process (S707) of recovering the content Cn, the process (S705) of delivering the recovered content Cn to the client that has transmitted the request for designating the content Cn, and the process (S706) of writing the recovered content Cn in the nonvolatile memory 242.

As described above, in a case where the delivery capability of the cache server 2-1 exceeds the first reference value, but the processor 22 receives the first recovery instruction from the control server 3, the processor 22 recovers the content Cn. As a result, it is possible to more flexibly control the determination as to whether or not to recover the content Cn.

Furthermore, in the content recovery processing of FIG. 14, the process of S702 of FIG. 18 may be executed after S301 of FIG. 14. As a result, the control server 3 is notified of the occurrence of a read error of the delivery target content. In addition, in the content recovery processing of FIG. 14, in a case where it is determined that the delivery capability of the cache server 2-1 calculated in S302 of FIG. 14 exceeds the first reference value (Yes in S303 in FIG. 14) or in a case where it is determined that the degree of wear-out calculated in S302 of FIG. 14 exceeds the second reference value (Yes in S304 in FIG. 14), the processes of S703 to S710 in the content recovery processing of FIG. 18 may be executed.

Furthermore, in the content recovery processing of FIG. 15, the process of S702 of FIG. 18 may be executed after S401 of FIG. 15. As a result, the control server 3 is notified of the occurrence of a read error of the delivery target content. In the content recovery processing of FIG. 15, in a case where it is determined that the delivery capability of the entirety of the plurality of the cache servers exceeds the third reference value (Yes in S404 in FIG. 15), the processes of S703 to S710 in the content recovery processing of FIG. 18 may be executed.

As described above, in a case where the content recovery processing of FIG. 18 is applied to the content recovery processing described with reference to FIGS. 13, 14, and 15, and an error has occurred in reading the delivery target content from the nonvolatile memory 242, the processor 22 notifies the control server 3 of the occurrence of the read error of the delivery target content. In a case where it is determined that the calculated delivery capability of the cache server 2-1 exceeds the first reference value (or it is determined that the calculated delivery capability of the entirety of the plurality of cache servers exceeds the third reference value), and then a recovery instruction (first recovery instruction) indicating that a delivery target content in which a read error has occurred is to be recovered has been received from the control server 3, the processor 22 executes processing of recovering the delivery target content, processing of delivering the recovered delivery target content to the client that has transmitted a request for designating the delivery target content, and processing of writing the recovered delivery target content in the nonvolatile memory 242.

Figure 19:
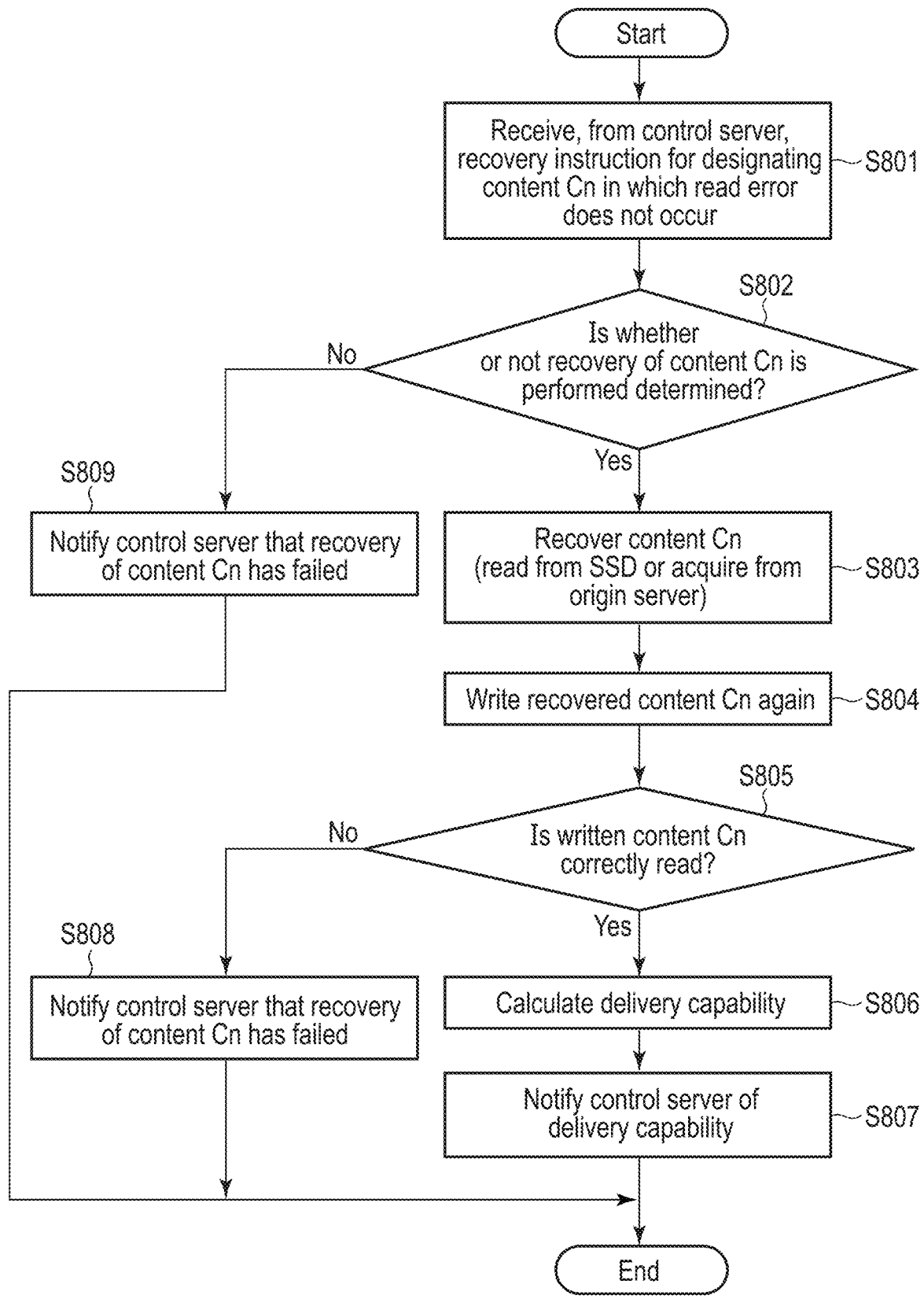
FIG. 19 is a flowchart illustrating a procedure of a seventh example of the content recovery processing executed in the cache server according to the embodiment.

Next, a seventh example of the content recovery processing will be described. FIG. 19 is a flowchart illustrating a procedure of the seventh example of the content recovery processing executed in the cache server 2-1 according to the embodiment. Here, content recovery processing executed in response to reception of a recovery instruction indicating that a content in which a read error do not occur is to be recovered from the control server 3 will be described.

The processor 22 receives, from the control server 3, a recovery instruction for designating a content (here, the content Cn) in which a read error does not occur (Step S801).

Based on the recovery instruction received in S801, the processor 22 determines whether or not recovery of the content Cn is performed in order to prevent a decrease in the delivery capability of the cache server 2-1 in advance (Step S802).

In a case where it is determined to recover the content Cn in order to prevent the decrease in the delivery capability of the cache server 2-1 in advance (Yes in S802), the processor 22 recovers the content Cn (Step S803). In this case, the processor 22 may acquire the content Cn from the origin server 1 or from one of the other cache servers 2-2 and 2-3, or may read the content Cn from the nonvolatile memory 242.

The processor 22 writes again the content Cn recovered in S803, that is, the content Cn acquired or read in S803 to the nonvolatile memory 242 (Step S804).

The processor 22 checks whether or not the content Cn written in S804 can be correctly read from the nonvolatile memory 242 (Step S805).

In a case where the content Cn can be correctly read (Yes in S805), the processor 22 calculates the delivery capability of the cache server 2-1 (Step S806).

The processor 22 notifies the control server 3 of the delivery capability calculated in S806 (Step S807).

In a case where the content Cn cannot be correctly read (No in S805), the processor 22 notifies the control server 3 that the recovery of the content Cn has failed (Step S808).

In a case where it is determined that the contents Cn is not recovered (No in S802), the processor 22 notifies the control server 3 that the recovery of the contents Cn has failed (Step S809).

As a result, the cache server 2-1 recovers the content Cn in which the read error does not occur, based on the recovery instruction received from the control server 3, and writes the recovered content Cn to the nonvolatile memory 242 again. As the time elapsed after the content Cn is first written becomes longer, the probability that the content Cn cannot be correctly read from the nonvolatile memory 242 may increase. In addition, if the read error of the content Cn has occurred, the delivery capability of the cache server 2-1 decreases. Therefore, under the control of the control server 3, the content Cn in which the read error does not occur is written again in the nonvolatile memory 242, so that it is possible to prevent the decrease in the delivery capability of the cache server 2-1 in advance.

Figure 20A:
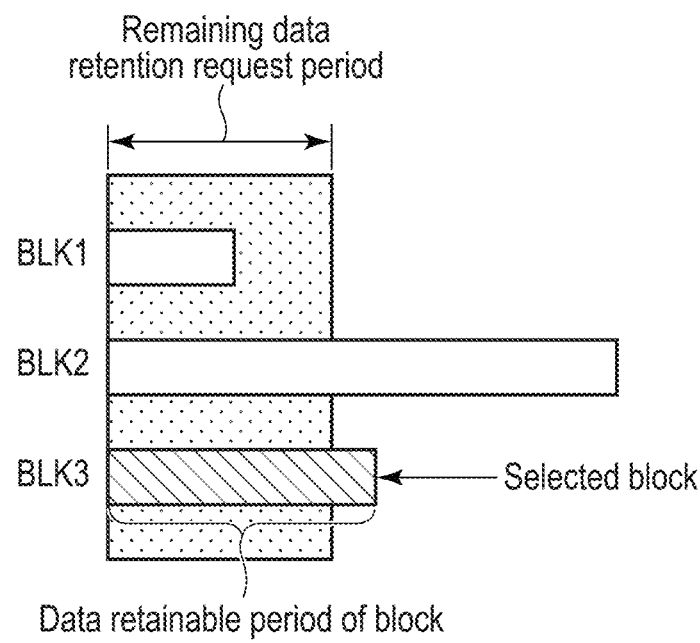
FIGS. 20A and 20B are diagrams for explaining an example of writing destination block selection processing executed in the cache server according to the embodiment.
Figure 20B:
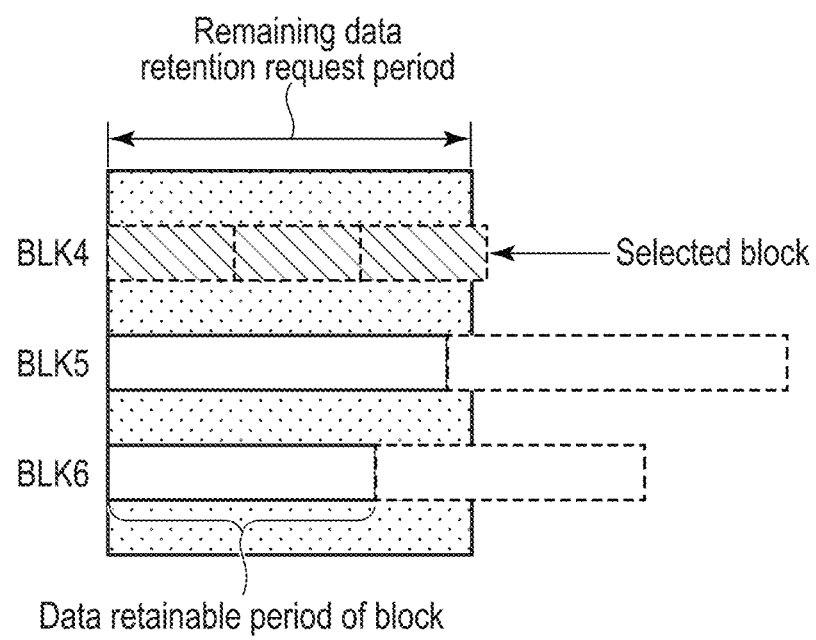

Next, selection of a writing destination block in content recovery will be described. FIGS. 20A and 20B are diagrams for explaining an example of writing destination block selection processing executed in the cache server 2-1 according to the embodiment. Here, it is assumed that the processor 22 selects a block of the nonvolatile memory 242, in which the recovered content is to be written.

The processor 22 manages a data retainable period of each of a plurality of blocks included in the nonvolatile memory 242. The processor 22 can acquire the data retainable period of each block from the controller 241 of the SSD 24-1. In addition, the processor 22 may estimate the data retainable period of each block based on the program/erase cycle count (the number of rewrites) of each block. The program/erase cycle count of each block can be acquired from the controller 241 of the SSD 24-1.

The processor 22 determines whether or not a block having a data retainable period longer than the remaining data retention request period of the recovered content is present in one or more blocks of the nonvolatile memory 242 available for writing data. The one or more blocks available for writing data are, for example, free blocks among a plurality of blocks included in the nonvolatile memory 242. The free block is a block that does not include valid data.

In FIG. 20A, a block BLK1, a block BLK2, and a block BLK3 are free blocks. The data retainable period of the block BLK1 is shorter than the remaining data retention request period of the recovered content. On the other hand, the data retainable period of each of the block BLK2 and the block BLK3 is longer than the remaining data retention request period of the recovered content.

Then, the processor 22 selects, as a writing destination block, a block having a data retainable period closest to the remaining data retention request period of the recovered content among blocks (here, the block BLK2 and the block BLK3) having a data retainable period longer than the remaining data retention request period of the recovered content. That is, the block selected as the writing destination block is the block BLK3.

As a result, the processor 22 can select, as the writing destination block, a block in which the recovered content can be retained during the remaining data retention request period.

On the other hand, as in FIG. 20B, in a case where there is no free block having the data retainable period that is longer than the remaining data retention request period of the recovered content, the processor 22 may select, as the writing destination block, a block having the smallest program/erase cycle count (number of rewrites). Alternatively, the processor 22 may calculate, for each free block, a period in which a data retainable period after the last rewriting necessary for retaining the recovered content for the remaining data retention request period or longer exceeds the remaining data retention request period of the recovered content, and may select a block having the shortest calculated period as the writing destination block. A case where the block having the shortest calculated period is used as the writing destination block will be described below.

In FIG. 20B, a block BLK4, a block BLK5, and a block BLK6 are free blocks. Therefore, candidates for the writing destination block are the blocks BLK4 to BLK6.

Regarding the block BLK4, in order to retain the recovered content for the remaining data retention request period or longer, it is necessary to execute three times of writing including one time of writing and two times of rewriting (refreshing). The second rewriting is the last rewriting necessary for retaining the recovered content for the remaining data retention request period or longer. The data retainable period of the block BLK4 after the second rewriting (that is, the third writing) is the data retainable period after the last rewriting.

Regarding the block BLK5, in order to retain the recovered content for the remaining data retention request period or longer, it is necessary to execute two times of writing including one time of writing and one time of rewriting (refreshing). The first rewriting is the last rewriting necessary for retaining the recovered content for the remaining data retention request period or longer. The data retainable period of the block BLK5 after the first rewriting (that is, the second writing) is the data retainable period after the last rewriting.

Regarding the block BLK6, in order to retain the recovered content for the remaining data retention request period or longer, it is necessary to execute two times of writing including one time of writing and one time of rewriting (refreshing). The first rewriting is the last rewriting necessary for retaining the recovered content for the remaining data retention request period or longer. The data retainable period of the block BLK5 after the first rewriting (that is, the second writing) is the data retainable period after the last rewriting.

The processor 22 calculates, for each of the block BLK5 and the block BLK6, a period in which the data retainable period after the last rewriting exceeds the remaining data retention request period of the recovered content. The processor 22 selects a block having the shortest calculated period as the writing destination block.

Among the block BLK4, the block BLK5, and the block BLK6, a block in which the period exceeding the remaining data retention request period of the recovered content is the shortest is the block BLK4.

Therefore, the processor 22 selects the block BLK4 as the writing destination block, and writes the recovered content to the block BLK4. The period exceeding the remaining data retention request period of the recovered content is a useless period that is not used to retain the recovered content. Therefore, by using a writing destination block selection processing illustrated in FIG. 20B, it is possible to more effectively use the data retainable period of the writing destination block.

Next, a procedure of content writing processing will be described. FIG. 21 is a flowchart illustrating a procedure of content writing processing executed in the cache server 2-1 according to the embodiment. The procedure of the content writing processing illustrated in FIG. 21 can be applied to, for example, the processes of S206 in FIG. 13, S307 in FIG. 14, S407 in FIG. 15, S505 in FIG. 16, S605 in FIG. 17, and S706 in FIG. 18.

First, the processor 22 determines whether or not a block having a data retainable period that is longer than the remaining data retention request period of the content is present in a set of free blocks (Step S901).

In a case where the block having the data retainable period that is longer than the remaining data retention request period is present in the set of free blocks (Yes in S901), the processor 22 selects a block having the data retainable period that is the closest to the remaining data retention request period among blocks having the data retainable period that is longer than the remaining data retention request period (Step S902).

In a case where the block having the data retainable period that is longer than the remaining data retention request period is not present in the set of free blocks (No in S901), the processor 22 selects a block having the smallest program/erase cycle count (number of rewrites) or a block in which a period exceeding the remaining data retention request period after the last rewriting is the shortest (Step S903).

In S902 or S903, the processor 22 writes the recovered content to the selected writing destination block (Step S904).

As described above, according to the present embodiment, in a case where an error has occurred in reading a content from the nonvolatile memory 242 of the SSD 24-1, the processor 22 determines whether or not to recover the content. As a result, the cache server 2-1 can reduce the frequency at which the recovered content is written in the nonvolatile memory 242, as compared with a case of unconditionally recovering the content. Thus, the cache server 2-1 can prevent the wear-out of the nonvolatile memory 242.

The processor 22 determines whether or not to recover the content, based on the delivery capability of the cache server 2-1. Therefore, in a case where the delivery capability of the cache server 2-1 becomes less than the reference value due to the content becoming undeliverable, the processor 22 recovers the content. As a result, the processor 22 can maintain the level of the delivery capability of the cache server 2-1 while suppressing the wear-out of the nonvolatile memory 242.

While certain embodiments have been described, these embodiments have been presented by way of example only, and are not intended to limit the scope of the inventions. Indeed, the novel devices and methods described herein may be embodied in a variety of other forms; furthermore, various omissions, substitutions and changes in the form of the embodiments described herein may be made without departing from the spirit of the inventions. The accompanying claims and their equivalents are intended to cover such forms or modification as would fall within the scope and spirit of the inventions.

What is claimed is:

1. A cache server connectable via a network to an origin server that is an external server retaining a plurality of contents, the cache server comprising:
a storage device that includes a nonvolatile memory having a finite data retainable period and a finite number of rewrites, and a controller configured to control the nonvolatile memory; and
a processor configured to: determine whether or not a first content requested from a client is stored in the nonvolatile memory; in a case where the first content is stored in the nonvolatile memory, execute reading the first content from the nonvolatile memory and delivering the read first content to the client via the network; and, in a case where the first content is not stored in the nonvolatile memory, execute acquiring the first content from the origin server, distributing the acquired first content to the client via the network, and writing the acquired first content in the nonvolatile memory, wherein
the processor is configured to:
in a case where an error has occurred in reading the first content from the nonvolatile memory,
calculate a delivery capability of the cache server related to a deliverable content stored in the nonvolatile memory, based on at least a predicted number of reads for each deliverable content stored in the nonvolatile memory;
determine whether or not the calculated delivery capability exceeds a first reference value;
in a case where it is determined that the calculated delivery capability exceeds the first reference value, not execute recovering the first content; and
in a case where it is determined that the calculated delivery capability does not exceed the first reference value, execute recovering the first content, delivering the recovered first content to the client via the network, and writing the recovered first content in the nonvolatile memory.

2. The cache server according to claim 1, wherein the processor is further configured to:
manage a degree of wear-out of the nonvolatile memory;
in a case where it is determined that the calculated delivery capability does not exceed the first reference value, determine whether or not the degree of wear-out of the nonvolatile memory exceeds a second reference value;
in a case where it is determined that the degree of wear-out exceeds the second reference value, not recover the first content; and
in a case where it is determined that the degree of wear-out does not exceed the second reference value, execute the recovering, the delivering, and the writing.

3. The cache server according to claim 1, wherein the cache server is connectable to one or more other cache servers via the network, and
the processor is further configured to:
notify each of the one or more other cache servers of the calculated delivery capability;
receive, from each of the one or more other cache servers, a delivery capability of each of the one or more other cache servers;
calculate the delivery capability of the entirety of a plurality of cache servers including the cache server and the one or more other cache servers based on the calculated delivery capability and the delivery capability of each of the one or more other cache servers;
determine whether or not the calculated delivery capability of the entirety of the cache servers exceeds a third reference value;
in a case where it is determined that the calculated delivery capability of the entirety of the cache servers exceeds the third reference value, not recover the first content; and
in a case where it is determined that the calculated delivery capability of the entirety of the cache servers does not exceed the third reference value, execute the recovering, the delivering, and the writing.

4. The cache server according to claim 3, wherein the processor is further configured to:
manage a degree of wear-out of the nonvolatile memory;
in a case where it is determined that the calculated delivery capability of the entirety of the cache servers does not exceed the third reference value, determine whether or not the degree of wear-out of the nonvolatile memory exceeds a second reference value;
in a case where it is determined that the degree of wear-out exceeds the second reference value, not recover the first content; and
in a case where it is determined that the degree of wear-out does not exceed the second reference value, execute the recovering, the delivering, and the writing.

5. The cache server according to claim 1, wherein the processor is further configured to:
recover the first content by acquiring the first content from the origin server or one of one or more other cache servers via the network.

6. The cache server according to claim 3, wherein the processor is further configured to:
recover the first content by acquiring the first content from the origin server or one of the one or more other cache servers via the network.

7. The cache server according to claim 1, wherein the processor is further configured to:
recover the first content by executing error correction processing different from error correction processing executed in the controller of the storage device by using data read from a plurality of storage devices provided in the cache server.

8. The cache server according to claim 1, wherein the cache server is connectable via the network to a control server, the control server being configured to control (i) the cache server or (ii) a plurality of cache servers including the cache server and one or more other cache servers, and
the processor is further configured to:
in a case where an error has occurred in reading of the first content from the nonvolatile memory, notify the control server of an occurrence of a read error of the first content; and
in a case where a first recovery instruction indicating that the first content is to be recovered is received from the control server, after determining that the calculated delivery capability exceeds the first reference value, or after determining that a calculated delivery capability of the entirety of the plurality of cache servers exceeds a third reference value, execute the recovering, the delivering, and the writing.

9. The cache server according to claim 3, wherein
the cache server is connectable via the network to a control server, the control server being configured to control (i) the cache server or (ii) the plurality of cache servers, and
the processor is further configured to:
in a case where an error has occurred in reading of the first content from the nonvolatile memory, notify the control server of an occurrence of a read error of the first content; and
in a case where a first recovery instruction indicating that the first content is to be recovered is received from the control server, after determining that the calculated delivery capability exceeds the first reference value, or after determining that a calculated delivery capability of the entirety of the plurality of cache servers exceeds the third reference value, execute the recovering, the delivering, and the writing.

10. The cache server according to claim 1, wherein
the cache server is connectable via the network to a control server, the control server being configured to control (i) the cache server or (ii) a plurality of cache servers including the cache servers and one or more other cache servers, and
the processor is further configured to:
receive, from the control server, a second recovery instruction indicating that a predetermined content is to be recovered;
in a case where an error has occurred in reading of the first content from the nonvolatile memory, determine whether or not the second recovery instruction indicating that the first content is to be recovered is received from the control server in advance; and
in a case where the second recovery instruction indicating that the first content is to be recovered is received from the control server in advance, execute the recovering, the distributing, and the writing.

11. The cache server according to claim 3, wherein
the cache server is connectable via the network to a control server, the control server being configured to control (i) the cache server or (ii) the plurality of cache servers, and
the processor is further configured to:
receive, from the control server, a second recovery instruction indicating that a predetermined content is to be recovered;
in a case where an error has occurred in reading of the first content from the nonvolatile memory, determine whether or not the second recovery instruction indicating that the first content is to be recovered is received from the control server in advance; and
in a case where the second recovery instruction indicating that the first content is to be recovered is received from the control server in advance, execute the recovering, the delivering, and the writing.

12. The cache server according to claim 1, wherein
the cache server is connectable via the network to a control server, the control server being configured to control (i) the cache server or (ii) a plurality of cache servers including the cache servers and one or more other cache servers, and
the processor is further configured to:
in response to receiving a third recovery instruction from the control server, the third recovery instruction indicating that a second content in which an error has not occurred in reading from the nonvolatile memory is to be recovered, determine whether or not to recover the second content to prevent a decrease in the delivery capability; and
in a case where it is determined to recover the second content in order to prevent the decrease in the delivery capability, read the second content from the nonvolatile memory or acquire the second content from the origin server or one of the one or more other cache servers, and write the read second content or the acquired second content again to the nonvolatile memory.

13. The cache server according to claim 3, wherein
the cache server is connectable via the network to a control server, the control server being configured to control (i) the cache server or (ii) the plurality of cache servers, and
the processor is further configured to:
in response to receiving a third recovery instruction from the control server, the third recovery instruction indicating that a second content in which an error has not occurred in reading from the nonvolatile memory is to be recovered, determine whether or not to recover the second content to prevent a decrease in the delivery capability; and
in a case where it is determined to recover the second content in order to prevent the decrease in the delivery capability, read the second content from the nonvolatile memory or acquire the second content from the origin server or one of the one or more other cache servers, and write the read second content or the acquired second content again to the nonvolatile memory.

14. The cache server according to claim 1, wherein
the cache server is connectable via the network to a control server, the control server being configured to control (i) the cache server or (ii) a plurality of cache servers including the cache servers and one or more other cache servers, and
the processor is further configured to:
determine whether or not the recovered first content is normally readable from the nonvolatile memory after the recovered first content is written in the nonvolatile memory;
in a case where it is determined that the recovered first content is not normally readable from the nonvolatile memory, notify the control server or each of the one or more other cache servers that the first content is lost; and
in a case where it is determined that the recovered first content is normally readable from the nonvolatile memory, calculate a delivery capability of the cache server after the recovery of the first content, and notify the control server or each of the one or more other cache servers of the calculated delivery capability of the cache server after the recovery of the first content.

15. The cache server according to claim 3, wherein
the cache server is connectable via the network to a control server, the control server being configured to control (i) the cache server or (ii) a plurality of cache servers including the cache servers and one or more other cache servers, and
the processor is further configured to:
determine whether or not the recovered first content is normally readable from the nonvolatile memory after the recovered first content is written in the nonvolatile memory;
in a case where it is determined that the recovered first content is not normally readable from the nonvolatile memory, notify the control server or each of the one or more other cache servers that the first content is lost; and in a case where it is determined that the recovered first content is normally readable from the nonvolatile memory, calculate a delivery capability of the cache server after the recovery of the first content, and notify the control server or each of the one or more other cache servers of the calculated delivery capability of the cache server after the recovery of the first content.

16. The cache server according to claim 1, wherein
the nonvolatile memory includes a plurality of blocks each of which is a unit of a data erasing operation, and
the processor is further configured to:
manage a data retainable period of each of the plurality of blocks;
determine whether or not one or more second blocks having a data retainable period that is equal to or longer than a remaining data retention request period of the recovered first content are present in one or more first blocks available for writing data;
in a case where the one or more second blocks are present, select a third block having a data retainable period closest to the remaining data retention request period from the one or more second blocks; and
write the recovered first content to the selected third block.

17. The cache server according to claim 2, wherein
the nonvolatile memory includes a plurality of blocks each of which is a unit of a data erasing operation, and
the processor is further configured to:
manage a data retainable period of each of the plurality of blocks;
determine whether or not one or more second blocks having a data retainable period that is equal to or longer than a remaining data retention request period of the recovered first content are present in one or more first blocks available for writing data;
in a case where the one or more second blocks are present, select a third block having a data retainable period closest to the remaining data retention request period from the one or more second blocks; and
write the recovered first content to the selected third block.

18. The cache server according to claim 16, wherein
the processor is further configured to:
calculate, for each of one or more first blocks, a period by which a data retainable period after last rewriting necessary for retaining the recovered first content for the remaining data retention request period or longer exceeds the remaining data retention request period;
select a fourth block having the shortest calculated period from the one or more first blocks; and
write the recovered first content to the selected fourth block.

19. The cache server according to claim 17, wherein
the processor is further configured to:
calculate, for each of one or more first blocks, a period by which a data retainable period after last rewriting necessary for retaining the recovered first content for the remaining data retention request period or longer exceeds the remaining data retention request period;
select a fourth block having the shortest calculated period from the one or more first blocks; and
write the recovered first content to the selected fourth block.

* * * * *